US012597253B2

(12) United States Patent (10) Patent No.: US 12,597,253 B2
Jarvis et al. (45) Date of Patent: Apr. 7, 2026

(54) SURVEY-BASED LOCATION OF ELECTRONIC SHELF LABEL (ESL) DEVICES

(71) Applicant: QUALCOMM Incorporated, San Diego, CA (US)

(72) Inventors: Murray Jarvis, Cambridge (GB); Ramji Srinivasan, Cambridge (GB); Thomas Allan, St. Neots (GB); Tingting Liu, Cambridge (GB); Paul Dominic Hiscock, Cambridge (GB); Benjamin Tarlow, Cambridge (GB); Nicolas Graube, Cambridge (GB); Abhishek Prasad, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 266 days.

(21) Appl. No.: 18/489,598

(22) Filed: Oct. 18, 2023

(65) Prior Publication Data

US 2025/0131724 A1 Apr. 24, 2025

(51) Int. Cl.
*G06V 20/50* (2022.01)
*G06T 7/579* (2017.01)
(Continued)

(52) U.S. Cl.
CPC .............. *G06V 20/50* (2022.01); *G06T 7/579* (2017.01); *G06T 7/70* (2017.01); *G06V 20/52* (2022.01); *G06V 20/60* (2022.01); *H04W 4/35* (2018.02)

(58) Field of Classification Search
None
See application file for complete search history.

(56) References Cited

U.S. PATENT DOCUMENTS

2016/0299213 A1* 10/2016 Jones .................. H04L 63/0861
2017/0103515 A1 4/2017 Hulth
(Continued)

FOREIGN PATENT DOCUMENTS

WO WO-2019073063 A1 * 4/2019 ............. G06Q 30/02
WO WO-2023193932 A1 * 10/2023 ............... H04N 7/22

OTHER PUBLICATIONS

International Search Report and Written Opinion—PCT/US2024/044252—ISA/EPO—Dec. 9, 2024.

*Primary Examiner* — Delomia L Gilliard
(74) *Attorney, Agent, or Firm* — NORTON ROSE FULBRIGHT US LLP

(57) ABSTRACT

This disclosure provides systems, methods, and devices for Electronic Shelf Label (ESL) systems that support positioning of ESL devices. In a first aspect, a method includes: transmitting, to each ESL device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data. Other aspects and features are also claimed and described.

26 Claims, 8 Drawing Sheets

(51) Int. Cl.
G06T 7/70 (2017.01)
G06V 20/52 (2022.01)
G06V 20/60 (2022.01)
H04W 4/35 (2018.01)

(56) References Cited

U.S. PATENT DOCUMENTS

2018/0293593 A1* 10/2018 De Bruijn ............ H04B 10/116
2019/0354824 A1* 11/2019 Mohiuddin ........ G06K 19/0704
2019/0362300 A1* 11/2019 Bottine ............... G06Q 10/087
2020/0158811 A1   5/2020 Rößl
2020/0234394 A1*  7/2020 Calhoon ............... G06V 10/50
2020/0311794 A1* 10/2020 High .................... G06F 3/1454
2020/0402429 A1* 12/2020 Cho ..................... G06Q 20/208
2022/0051310 A1*  2/2022 Graube ............. G06Q 30/0633
2023/0028355 A1*  1/2023 Nilsson ............... H04B 10/116
2024/0331016 A1* 10/2024 Filali Ansary ........ H04W 4/024

* cited by examiner

Gondola
112A

Shelf
202A

ESL
108A

202B

202C

202D

208

202A    112A

212

210

112B

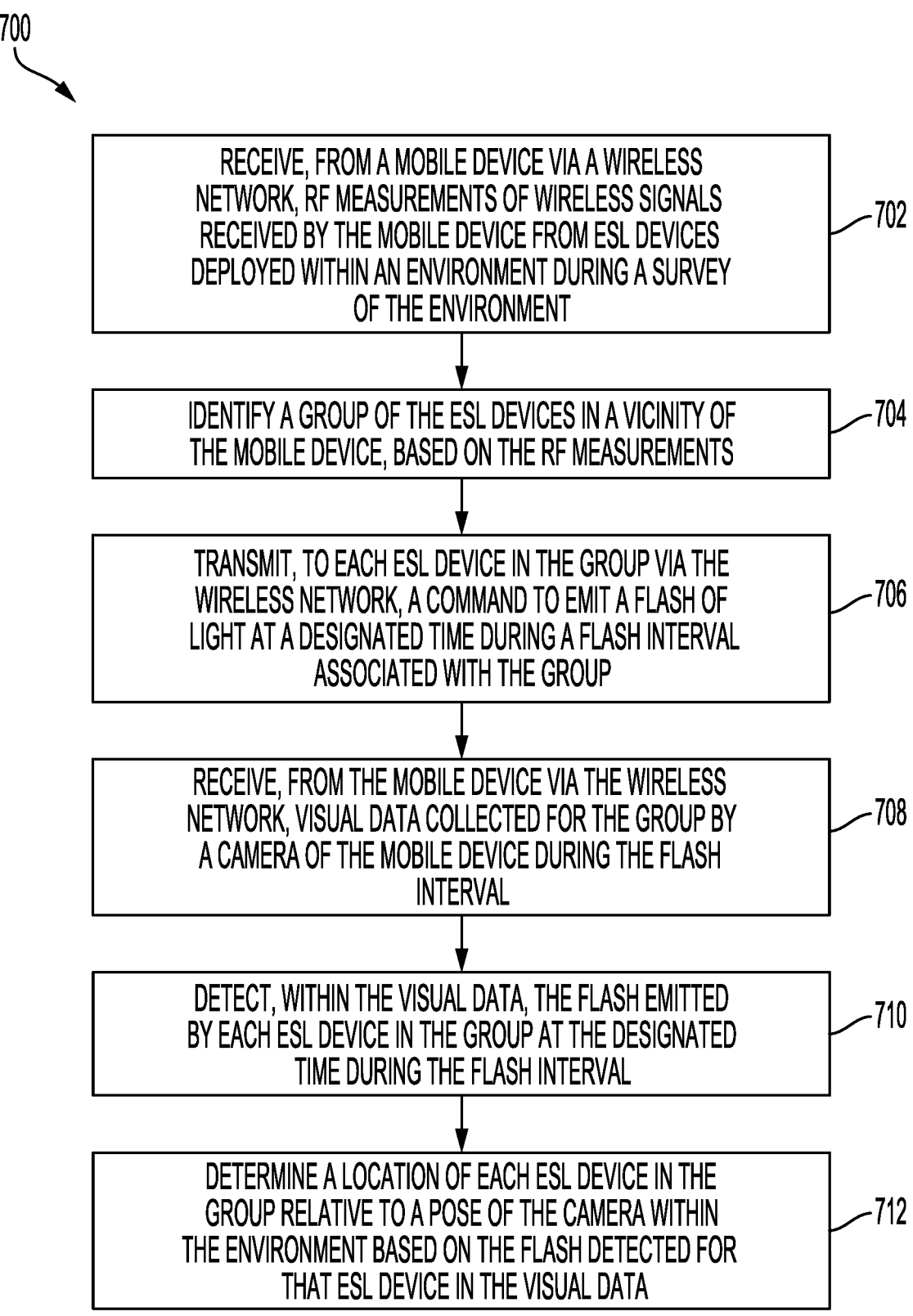

700

RECEIVE, FROM A MOBILE DEVICE VIA A WIRELESS NETWORK, RF MEASUREMENTS OF WIRELESS SIGNALS RECEIVED BY THE MOBILE DEVICE FROM ESL DEVICES DEPLOYED WITHIN AN ENVIRONMENT DURING A SURVEY OF THE ENVIRONMENT ⎯702

IDENTIFY A GROUP OF THE ESL DEVICES IN A VICINITY OF THE MOBILE DEVICE, BASED ON THE RF MEASUREMENTS ⎯704

TRANSMIT, TO EACH ESL DEVICE IN THE GROUP VIA THE WIRELESS NETWORK, A COMMAND TO EMIT A FLASH OF LIGHT AT A DESIGNATED TIME DURING A FLASH INTERVAL ASSOCIATED WITH THE GROUP ⎯706

RECEIVE, FROM THE MOBILE DEVICE VIA THE WIRELESS NETWORK, VISUAL DATA COLLECTED FOR THE GROUP BY A CAMERA OF THE MOBILE DEVICE DURING THE FLASH INTERVAL ⎯708

DETECT, WITHIN THE VISUAL DATA, THE FLASH EMITTED BY EACH ESL DEVICE IN THE GROUP AT THE DESIGNATED TIME DURING THE FLASH INTERVAL ⎯710

DETERMINE A LOCATION OF EACH ESL DEVICE IN THE GROUP RELATIVE TO A POSE OF THE CAMERA WITHIN THE ENVIRONMENT BASED ON THE FLASH DETECTED FOR THAT ESL DEVICE IN THE VISUAL DATA ⎯712

FIG. 7

SURVEY-BASED LOCATION OF ELECTRONIC SHELF LABEL (ESL) DEVICES

TECHNICAL FIELD

Aspects of the present disclosure relate generally to electronic shelf label (ESL) systems, and more particularly, to methods and systems for locating ESL devices of an ESL system deployed within an indoor environment.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to make mistakes, such as mislabeling a shelf or product or forgetting to take down temporary price changes on certain shelving, which results in shopper frustration.

Electronic shelf label (ESL) devices are electronic devices for displaying price or other relevant information for items on retail store shelves, which may be used in place of paper labels. ESL devices may be attached to a front edge of retail shelving and display a variety of information using display devices, such as Liquid Crystal Displays (LCDs) or e-ink displays. Whenever the information about a product or the location of a product is changed, the ESL device may be programmed with new product information. Thus, the same electronic shelf label can be repeatedly used.

The individual devices or nodes of an ESL system may be equipped with Bluetooth Low Energy (BLE) radios that can be used to track the location of a BLE-enabled device based on the known locations of nearby ESL devices within an indoor environment, such as a retail environment associated with a retail store or distribution warehouse. However, an ESL system may include hundreds or thousands of ESL devices that are deployed across different shelves throughout the environment and determining the location of each ESL device may be a labor-intensive and time-consuming process. The techniques described herein may also provide knowledge of ESL locations, which may be used to link the real store and the virtual store (a.k.a. planogram) to allow for operations such as automatic validation of the planogram.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Electronic shelf label (ESL) devices of an ESL system deployed within an environment (such as a retail environment associated with a retail store or a distribution warehouse) may be used to provide different kinds of information and services to various users of the ESL system (such as shoppers or store workers). For example, ESL devices operating on a wireless network as part of the ESL system may support indoor positioning services to identify the respective locations of ESL devices within the environment (e.g., on shelves of gondolas located within a retail store). As another example, the ESL system may support position location services to identify a position of a user (or user device) and/or other devices or objects within the environment.

As still another example, the ESL system may be used to provide surveying techniques for determining the locations of ESL devices deployed within the environment based on information collected by a mobile device during a survey of the environment. Knowing the locations of the ESL devices enables the ESL system to provide more accurate location services, for example, by using the ESL locations as reference points that help determine a user's position in the environment with higher accuracy. In some embodiments, the mobile device used for the survey of the environment may function as a survey device operated by a human surveyor (e.g., a store worker) or an autonomous robot to collect visual data and other information pertaining to the ESL devices in a vicinity of the mobile device as it (and the user or robot) moves through the environment during the survey. For example, the mobile device may be equipped with a digital camera that captures images and/or video (e.g., as a sequence of image/video frames) representing different groups of ESL devices appearing within the camera's field of view at different intervals over the course of the survey. Additionally, the device may be equipped with a wireless radio for collecting radio frequency (RF) measurements of beacon signals received from a group of ESL devices at each interval.

In some embodiments, RF measurements collected by the mobile device may be used by a server of the ESL system to organize the collection of video data and additional RF data for a group of ESL devices during the survey. For example, the server may broadcast or transmit a command to each ESL device in the identified group to emit a flash of light (e.g., using a light source of the ESL device) at a designated time slot lasting a brief period of time (e.g., 10 to 20 ms) over a flash interval associated with the group during the survey. As will be described in further detail below, the visual data and any RF measurements collected by the mobile device for a group of ESL devices during the survey may be processed by a server of the ESL system to distinguish which ESL device emitted the flash detected in each image frame captured by the mobile device's camera during the survey (e.g., the identity of the ESL devices in the video data). The processed data may be combined with information derived from structure-from-motion (SFM) techniques applied to the video data to determine a location of each ESL device in the group relative to a pose (e.g., a position and/or orientation) of the camera within a three-dimensional (3D) coordinate space representing the environment.

Example embodiments provide systems and methods for locating ESL devices in an environment based, at least in part, on visual data acquired by a camera of a mobile device during a survey of the environment.

In one aspect of the disclosure, a method includes: transmitting, by a server to each electronic shelf label (ESL) device in a group of ESL devices deployed within an environment via a wireless network associated with the environment, a command to emit one or more flashes of light over a flash interval associated with the group; receiving, by the server from a mobile device via the wireless network, visual data collected for the group by a camera during the flash interval; detecting, by the server within the visual data, the one or more flashes emitted by each ESL device in the group over the flash interval; and determining, by the server, a location within the environment of each ESL device in the group based on the one or more flashes emitted by each ESL device in the visual data.

In an additional aspect of the disclosure, an apparatus includes at least one processor and a memory coupled to the at least one processor. The at least one processor is configured to perform operations comprising: transmitting, to each electronic shelf label (ESL) device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

In an additional aspect of the disclosure, a non-transitory computer-readable medium stores instructions that, when executed by a processor, cause the processor to perform operations. The operations include: transmitting, to each electronic shelf label (ESL) device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

In an additional aspect of the disclosure, an electronic shelf label (ESL) system comprises a group of electronic shelf label (ESL) devices; and a server comprising a memory and at least one processor coupled to the memory. The at least one processor is configured to perform operations comprising: transmitting, to each electronic shelf label (ESL) device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Devices, networks, and systems may be configured to communicate via one or more portions of the electromagnetic spectrum. The present disclosure describes certain aspects with reference to certain communications technologies, such as Bluetooth or Wi-Fi. However, the description is not intended to be limited to a specific technology or application, and one or more aspects described with reference to one technology may be understood to be applicable to another technology. Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

For example, the described implementations may be implemented in any device, system, or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (5G NR), 6G, or other known signals that are used to communicate within a wireless, cellular, or internet of things (IoT) network, such as a system utilizing 3G, 4G 5G, or 6G technology, or further implementations thereof.

In various implementations, the techniques and apparatus may be used in wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably and may refer to a collection of devices capable of communicating with each other through one or more communications techniques.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.).

Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, or constitutions.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a device is described as containing components A, B, or C, the device may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow chart of an example method for locating ESL devices in an environment based, at least in part, on visual data acquired by a camera of a mobile device during a survey of the environment according to some embodiments of this disclosure.

Like reference numbers and designations in the various drawings indicate like elements.

DETAILED DESCRIPTION

Figure 1A:
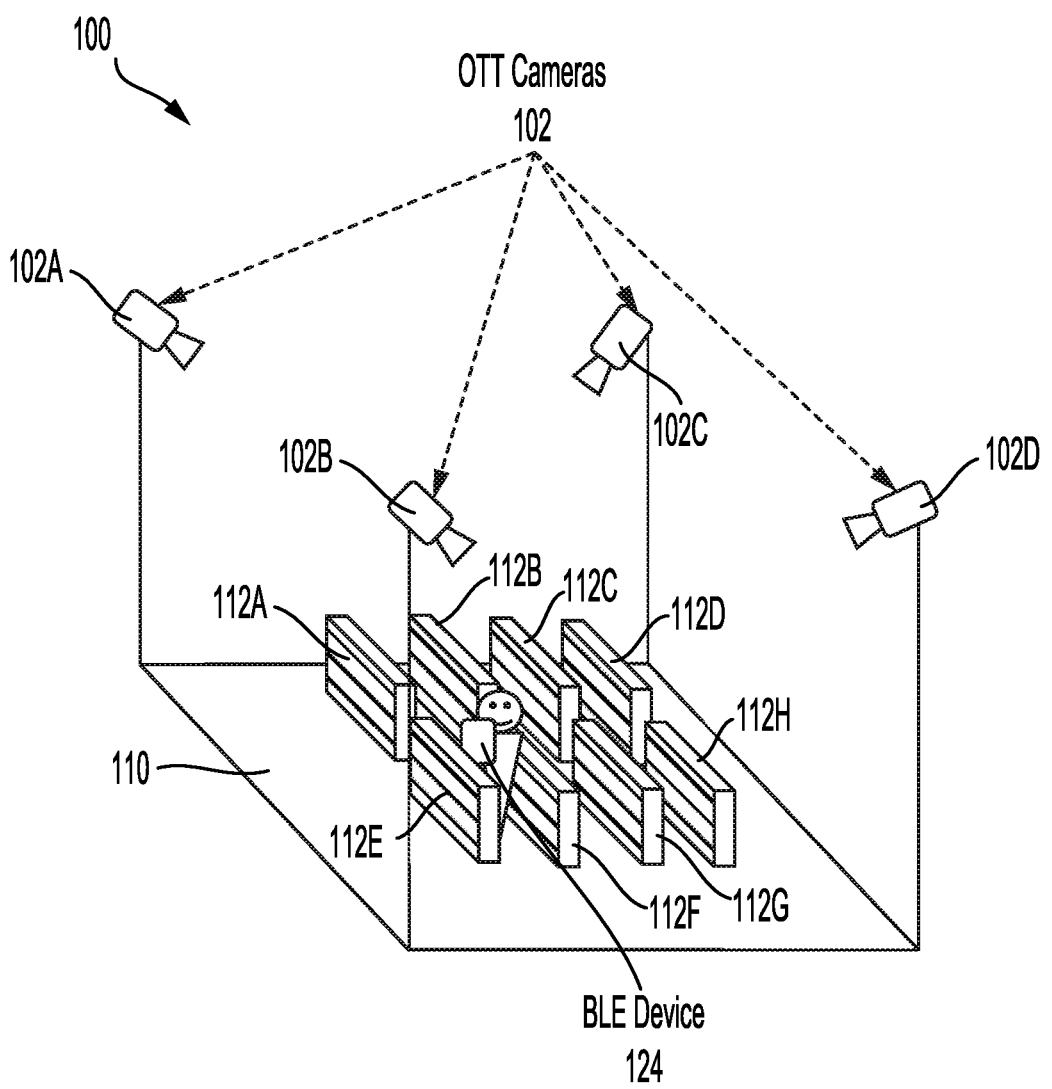
FIG. 1A is a block diagram illustrating a perspective view of an example Electronic Shelf Label (ESL) system within a retail environment according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support indoor positioning of devices, such as Electronic Shelf Label (ESL) devices of an ESL system, within an environment. Particular implementations of the subject matter described in this disclosure may be implemented to realize one or more of the following potential advantages or benefits. In some aspects, the present disclosure provides surveying techniques for locating ESL devices that may be particularly beneficial in a retail environment. For example, the ESL device locations determined using the disclosed surveying techniques may be combined with information pertaining to a layout of the retail environment, e.g., as provided by a planogram, to create a detailed map of the environment with a fingerprint of its distinctive features and landmarks, such as the specific arrangement of products, shelves, gondolas, and other fixtures in the indoor space. The ESL system may combine information from the detailed map with signal measurements for different ESL locations to more accurately determine the user's location in the environment and provide enhanced navigation or other location-based services. The terms "environment" and "retail environment" are used interchangeably herein to refer broadly and inclusively to any physical space or layout (e.g., within a physical "brick-and-mortar" retail store or distribution warehouse) where a business operates (e.g., to provide products or services to customers). In an example embodiment, a planogram provides a virtual layout of the store, and the planogram may be supplemented with physical information about ESL locations determined according to techniques described herein.

In some embodiments, the ESL system may utilize a wireless network and network infrastructure of the environment to provide a service for locating ESL devices within the environment based on information collected by a mobile device during a survey of the environment. The mobile device in this context may function as a survey device operated by a human surveyor (e.g., a store worker) or an autonomous robot (e.g., an autonomous guided vehicle (AGV) or an autonomous mobile robot (AMR)) to collect visual data and other information pertaining to nearby ESL devices while moving through the environment. For example, the mobile device may be equipped with a digital camera that collects a sequence of images and/or video frames of ESL devices appearing within the camera's field of view during the survey. Additionally, the mobile device may be equipped with a wireless radio (e.g., a Bluetooth Low Energy (BLE) radio) for collecting radio frequency (RF) measurements of beacon signals (e.g., BLE beacons) received from each ESL device. In some embodiments, an ESL beacon including an ESL identifier (ID) or other information identifying a particular ESL device may be received by the mobile device at or around the same time an image or video frame for the ESL device is captured.

In some embodiments, a server of the ESL system may identify a group of ESL devices in a vicinity of the mobile device based on the RF measurements received from the mobile device as it and the user (or surveyor) travel through the environment. A "vicinity" of the mobile device may include a certain radius or area surrounding the mobile device's current position in which ESLs or other devices in proximity to the mobile device may be located within the environment. In some implementations, the size of the radius or surrounding area may be predefined. Alternatively, the size of area may vary depending on the wireless signaling capabilities or particular wireless technology supported by the mobile device. For example, devices in the "vicinity" of the mobile device may be limited to those located within a wireless signaling range of the mobile device and thus, sufficiently close enough to exchange wireless signals with the mobile device.

In some embodiments, the group of ESL devices identified by the server may include an initial set of ESL devices for which the RF measurements (e.g., received signal strength indicator (RSSI) values) are the strongest and thus, most likely to appear within a field of view of the mobile device's camera. The server may also identify additional ESL devices in the vicinity of the mobile device based on additional RF measurements received from each ESL device in the initial set. The additional RF measurements may be based on beacon signals received by each initial ESL device from one or more of its neighboring ESL devices. Such ESL-to-ESL measurements allow the server to identify any neighboring ESL device for which the initial RF measurements received from the mobile device are very weak or missing altogether, e.g., due to physical obstructions or other environmental conditions affecting signal propagation between the mobile device and the neighboring ESL device. The ESL-to-ESL measurements in combination with the RF measurements from the mobile device allow the server to create a dynamic blueprint or graph of nearby ESL devices in the vicinity (e.g., within a certain radius or surrounding area) of the mobile (survey) device's current position within the environment. Such measurements may also be used by the server to predict which ESL devices are upcoming along the likely to be in the vicinity of the mobile device and update the graph accordingly as the mobile device's position within the environment changes over the course of the survey. This may help to improve the server's tolerance to any system delays that may occur during the survey.

In some embodiments, the server may initiate the survey for a group of ESL devices identified as being in the vicinity of the mobile device (e.g., based on their respective RSSI values) by instructing each ESL device in the group to emit a flash of light using a light source, such as a light emitting diode (LED), of the ESL device at a specified time slot (or subinterval) during the survey. In some implementations, the "light" emitted by the ESL device may be invisible to the naked eye and may include, for example, infrared light, ultraviolet light, or other forms of light with wavelengths that are shorter or longer than the wavelength of visible light. The specified time slot may be a time period lasting a short duration, e.g., 10-20 milliseconds (ms), which is allocated to each ESL device over an interval of time (or "flash interval") designated for the group during the survey. As each ESL device emits the flash at its specified time slot during the survey, a camera of the mobile device may capture a corresponding image or video frame including the flash emitted by the ESL device.

As described above, an ESL beacon including information identifying the particular ESL device may also be received (and measured) by the mobile device at or around the same time (e.g., during the specified time slot) as the image/video frame of the flash from the ESL device is captured by a camera of the mobile device. In some implementations, this information may be used by a server of the ESL system while post-processing the survey data to distinguish which ESL device emitted the flash detected in each image frame captured by the mobile device's camera during the survey. If the information received from the mobile device indicates that multiple ESL beacons were received from different ESL devices at the same time (or during the same time period) as the flash or corresponding image frame was captured by the camera, the server may use RF measurements from the mobile device to select the ESL device that produced the strongest ESL beacon. In some embodiments, the visual data received by the server from the mobile device may include information derived from any image processing performed at the mobile device, e.g., after the images were captured by the camera of the mobile device. Such information may include, for example, information pertaining to the pixel locations of flashes within the captured image frames and the timing of the flashes (or corresponding image frames) as captured on the mobile device. In some implementations, each ESL device may include an ultrasonic transmitter that can emit (in addition to the flash and/or ESL beacon) an ultrasonic chirp detectable by a microphone of the mobile device to further distinguish the ESL device from others.

As an alternative to using ESL beacons or RF signals to distinguish the flashes emitted by different ESL devices, the server may synchronize the ESL devices to flash multiple times relative to a common reference time at the start of the flash interval. For example, the server may instruct each of the ESL devices in a group to perform an initial synchronous flash (or flash simultaneously) at the common reference time and then individually flash at a specified offset from the reference time or after a specified delay following the initial synchronous flash. This allows the server to onboard the group of ESL devices onto a common periodic advertising (PA) train corresponding to the flash interval designated for the group during the survey. During the survey post-processing stage, the synchronous flash detected by the server in the visual data (e.g., sequence of image/video frames) received from the mobile device may serve as a marker indicating the common reference time at the start of the PA train (and start time of the flash interval associated with the group of ESL devices). Furthermore, each individual flash detected between consecutive frames (or from one frame to the next) may serve as a marker indicating the time slot (or offset relative to the common reference time) specified for a particular ESL device in the group according to its position on the PA train (e.g., based on the order in which it was added to the PA train). In some embodiments, the flash of light emitted by each ESL device at a point within a corresponding image frame may be detected by applying one or more object detection algorithms or image filters to the image frame. For example, an image filter may be applied to the image frame to detect the flash emitted by each ESL device based on a sudden change in pixel intensity for an expected duration (e.g., 10-20 milliseconds) and/or a color of light associated with a light source of that ESL device.

In some embodiments, the server may apply structure-from-motion techniques to post-process the visual data and any associated RF information to determine a track of the mobile device and surveyor through the environment during the survey. In this context, the individual ESL flashes detected by the server in the processed visual data, e.g., using object detection and/or other image processing techniques, may serve as uniquely identifiable scale-invariant feature transform (SIFT) features that can augment, if not replace, other SIFT features identified by the server from the visual data, e.g., using more traditional structure-from-motion techniques.

The output of such post-processing may include, for example, a point cloud with the locations of the ESL devices marked (e.g., as x-y-z coordinates within a three-dimensional (3D) coordinate space representing a structure-from-motion map of the environment or particular area thereof in which the ESL devices are located). For example, the point within the image frame at which the flash of light emitted by each ESL device is detected may be used to map the location of the ESL device to a set of coordinates within the 3D coordinate space. The set of coordinates for each ESL device may be determined using structure-from-motion analysis of the visual data (or corresponding image frame). The point cloud may then be visualized onto a map of the environment, such as a retail environment of a store or distribution warehouse, which can be subsequently used to provide users (e.g., retail store customers) with indoor positioning and navigation services, as will be described in further detail below.

FIG. 1A is a block diagram illustrating a perspective view of an example ESL system 100 within a retail environment according to some embodiments of this disclosure. As shown in FIG. 1A, the ESL system 100 may be deployed across multiple aisles of gondolas 112A-112H within a retail environment 110. The retail environment 110 may include, for example, a retail floor space of a retail store. As will be described in further detail below, each of the gondolas 112A-112H may include one or more shelves to which a plurality of ESL devices are attached. The ESL devices may be used to display pricing and/or other information related to products located on the shelves. Each of the ESL devices may include one or more wireless radios for transmitting and receiving information over a wireless network associated with the retail store. Such radios may support any of various wireless communication standards and technologies. Examples of such technologies include, but are not limited to, Wi-Fi, Bluetooth, Bluetooth Low Energy (BLE), 5G NR, ultra-wideband (UWB), and other RF technologies.

As will be described in further detail below with respect to FIG. 1B, cameras may be installed on or near the shelves at the ends of the gondolas 112A-112H to capture different views of the aisles and/or other pathways in the areas surrounding the gondolas 112A-112H. Additionally, over-the-top (OTT) cameras 102A-102D (or "OTT cameras 102" collectively) may be positioned at different overhead locations throughout the retail store to capture larger regions of the retail environment 110. In some implementations, the OTT cameras 102 may be part of a separate surveillance system of the retail store used for security and monitoring purposes.

In some embodiments, images and/or video captured by the OTT cameras 102 and/or those captured by the shelf cameras on the gondolas 112A-112H may be utilized as visual channel state information (CSI) to reduce, if not resolve, any errors or ambiguities detected in the position of a BLE device 124 within the retail environment 110. The BLE device 124 may be a mobile device of a user (e.g., a customer or employee of the retail store). The BLE device 124 may be equipped with camera for capturing visual data of nearby ESL devices. The BLE device 124 may also be equipped with a BLE radio for receiving low power beacon signals transmitted by the ESL devices attached to the gondolas 112A-112H. In some implementations, the visual data and radio frequency (RF) measurements of the signals received by the BLE radio of the BLE device 124 from the nearby ESL devices may be provided to a management server of the ESL system 100 for monitoring or tracking the position of the BLE device 124 as it (and the user) traverses different areas of the environment 110. In some cases, the visual information captured by the OTT cameras 102 may be used to supplement or replace the visual data captured by the camera of the BLE device 124, as will be described in further detail below. In some embodiments, the cameras may be configured as part of a stock monitoring system, such that visual data identifying an empty shelf may be associated with a physical location of an ESL device to determine the product that is out of stock.

Figure 1B:
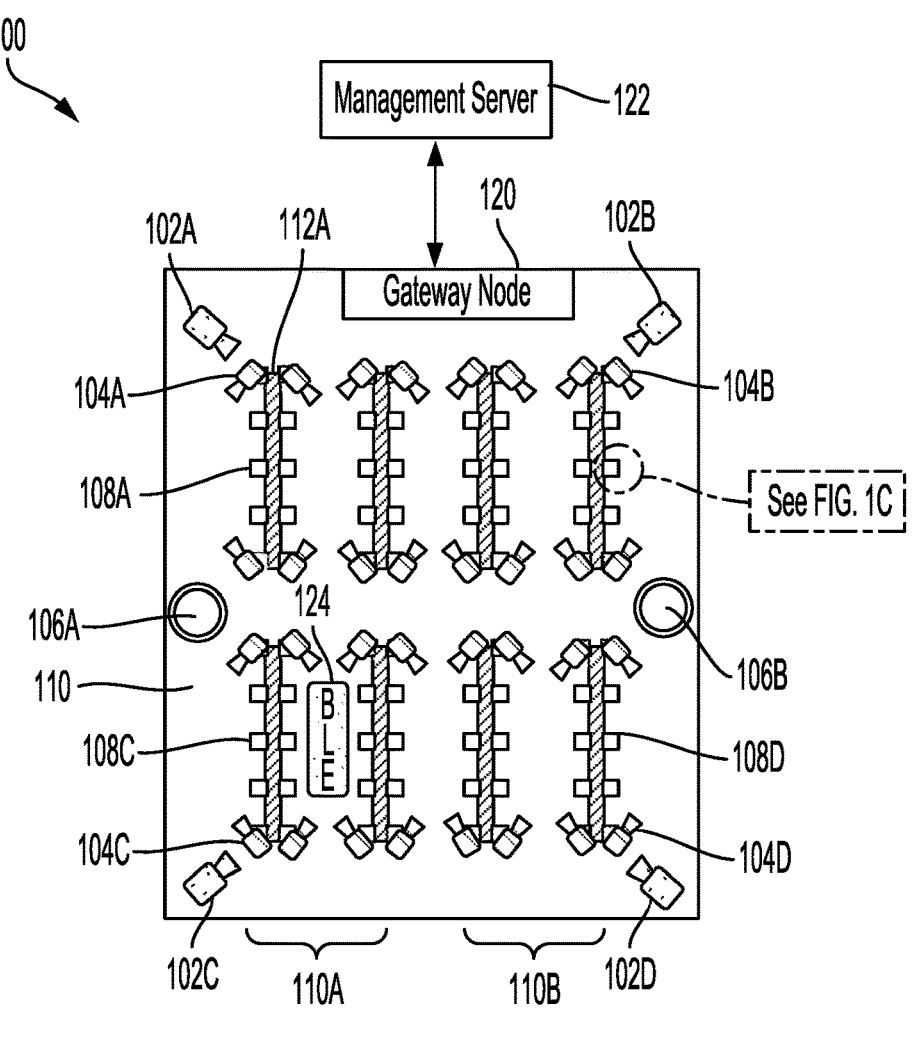
FIG. 1B is a block diagram of an overhead view of the ESL system of FIG. 1A according to some embodiments of the disclosure.

FIG. 1B is a block diagram of an overhead view of the ESL system 100 of FIG. 1A according to some embodiments of the disclosure. As shown in FIG. 1B, the ESL system 100 may further include a management server 122 that is integrated with or coupled to a gateway node 120. The management server 122 may include at least one processor coupled to a memory, in which the at least one processor is configured to execute computer program code stored on a non-transitory computer-readable medium to cause the management server 122 to perform operations related to the management and control of ESL devices 108A-108D, access points (APs) 106A and 106B, the gateway node 120, and/or other components of the ESL system 100. In some embodiments, the management server 122 may perform operations for locating ESL devices (including the ESL devices 108A-108D) in the environment 110 based, at least in part, on visual data acquired by a camera of the BLE device 124 during a survey of the environment 110, as will be described in further detail below with reference to FIGS. 5-7.

The gateway node 120 may communicate with access point (AP) 106A and access point (AP) 106B. Although only two APs are shown in the example of FIG. 1B, fewer or more APs may be included in the ESL system 100. The APs 106A and 106B may communicate through a first communication network, either wired or wireless, with the gateway node 120. The APs 106A and 106B may also communicate through a second communication network with the ESL devices 108A-108D. In some embodiments, the first and second communication networks may be different networks. For example, the first communication network (e.g., between the AP 106A and the gateway node 120) may be a Wi-Fi network, and the second communication network (e.g., between the AP 106A and the ESL device 108A) may be a Bluetooth network. In some implementations, the APs 106A and 106B may be part of a wireless infrastructure of the retail environment 110 that supports one or more wireless technologies (e.g., Wi-Fi, Bluetooth, BLE, and/or UWB). The infrastructure may be utilized by the ESL system 100 for enabling the survey-based ESL positioning techniques disclosed herein.

In some embodiments, each of the APs 106A and 106B may communicate with a subset of the ESL devices 108A-108D located in a geographic area assigned to that AP, e.g., based on a location of the AP relative to each ESL device and/or a signal coverage area of the AP. For example, the retail environment 110 may be divided into two equally-sized geographic areas that each cover approximately half of the total retail environment 110. The AP 106A may be assigned to a geographic area 110A, and the AP 106B may be assigned to a geographic area 110B. Accordingly, the AP 106A may communicate with ESL device 108A and ESL device 108B located in the geographic area 110A, and the AP 106B may communicate with ESL device 108C and ESL device 108D located in the geographic area 110B.

Bluetooth technology provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet. In the example of FIG. 1B, the ESL devices 108A and 108C may be in a piconet with the AP 106A.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. Thus, the ESL device 108A in FIG. 1B may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an ESL Profile compliant with, for example, the Electronic Shelf Label Profile Specification v1.0 dated Mar. 28, 2023 and the Bluetooth Core Specification v5.4 dated Jan. 31, 2023 ("Bluetooth Core Specification") and/or subsequent versions of these Specifications released thereafter, which are incorporated by reference herein. The ESL Profile may specify how the AP 106A may use one or more ESL Services exposed by the ESL device 108A.

In some embodiments, the management server 122 may include or be coupled to a database that stores and manages product information regarding products displayed in a retail store or distribution warehouse. The database may also store information used by the management server 122 to manage operations of the ESL system 100 and its various components (including the ESL devices 108A-108D and the APs 106A and 106B). Such information may include, for example, the location and other relevant information for each component of the ESL system 100 (including each of the ESL devices 108A-108D and the APs 106A and 106B). In some implementations, the database may be part of an Enterprise Resource Planning (ERP) system for managing and tracking inventory (e.g., products), different components of the ESL system 100, and other devices located in the retail environment 110. The ERP inventory management system may be implemented either separately from or as a part of the ESL system 100.

In some embodiments, the management server 122 may generate and transmit command messages to the ESL devices 108A-108D via the first communication network described above. The command messages may be used by the management server 122 to carry out various functions in the ESL system 100, such as the synchronization, updating, and alteration of product information displayed on the ESL devices 108A-108D. The management server 122 may obtain the product information from a product database provided for the ESL devices 108A-108D. For example, the management server 122 may access the database of the ERP system described above for identification information relating to the ESL devices 108A-108D in connection with product information displayed on a corresponding one of the ESL devices 108A-108D.

A command message created by the management server 122 (e.g., a product-information change message or a management-information acquisition message) can be transferred to the gateway node 120 as part of a packet suitable for a communication scheme used with the gateway node 120. Furthermore, the management server 122 may receive a reception acknowledgement message sent from the gateway node 120 using the communication scheme. In some cases, the acknowledgement message may be first converted into a message format suitable for reception by the management server 122 before being transferred by the gateway node 120.

In some embodiments, the command messages transmitted by the management server 122 via the gateway node 120 may include commands directed to different devices in the ESL system 100 for conducting a survey of the retail environment 110 to collect data for locating ESL devices in the environment 110. Examples of such commands may include, but are not limited to, commands directing the BLE device 124 and/or a group of ESL devices (including one or more of the ESL devices 108A-108D) determined to be in a vicinity of the BLE device 124 during the survey to report RF measurements of beacon signals received from nearby ESL devices. As will be described in further detail below with respect to FIGS. 5-7, visual data collected by a camera of the BLE device 124 and the RF measurements of ESL beacon signals received from the BLE device 124 and/or the ESL devices during the survey may be processed by the management server 122 using structure-for-motion techniques and the processed information may be used to locate each ESL device (including each of ESL devices 108A-108D) in the retail environment 110.

Although only one gateway node 120 is shown in the ESL system 100, there may be several such gateway nodes communicating with the management server 122. Each gateway node 120 analyzes data received from the management server 122 confirming the presence or absence of a message or data, which is to be sent to the ESL device 108A, and then sends the confirmed message or data to the corresponding ESL device 108A. The gateway node 120 may configure a message, which is to be sent to the ESL device 108A, into a packet according to a suitable communication scheme and send the packet with a command to the AP 106A to transmit the packet to the ESL device 108A. Furthermore, the gateway node 120 may transfer a reception acknowledgement message received from the ESL device 108A through the AP 106A to the management server 122.

Figure 1C:
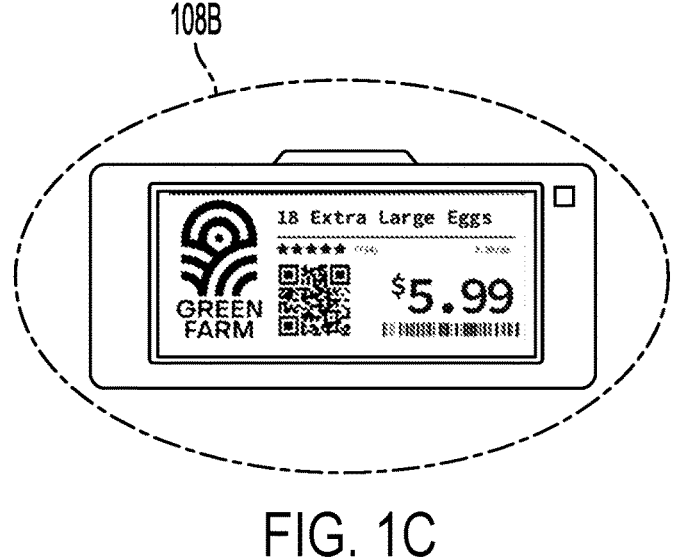
FIG. 1C is a diagram illustrating an example ESL device in the ESL system of FIGS. 1A and 1B according to some embodiments of the disclosure.

Each of the ESL devices 108A-108D may include a display, such as a Liquid Crystal Display (LCD) or e-ink display, for displaying data concerning products located on a shelf to which the corresponding ESL device is attached. The information displayed by each of the ESL devices 108A-108D may be received from the gateway node 120. The ESL devices 108A-108D may change price information or be activated or inactivated while communicating with the gateway node 120. A store manager may send the management server 122 a command concerning the synchronization between a product and a specified ESL device and/or a command for the correction of information regarding a product assigned to the particular ESL device. An example of the ESL device 108B is shown in FIG. 1C with a display device for displaying product information, such as a product description, a product image, a product price, a product barcode, a product rating, a product Stock Keeping Unit (SKU), and/or a product link (e.g., a URL or QR code).

In some embodiments, each of the ESL device 108A-108D may be configured with a memory, a microprocessor, and other components (such as a wireless radio and a light source) for performing various operations relating to the survey-based ESL location techniques disclosed herein. An example of such an ESL device configuration will be described in further detail below with reference to FIG. 4.

In some embodiments, visual information obtained from the shelf cameras 104A-104D and/or the OTT cameras 102 may be used to augment the indoor positioning and product tracking capabilities of the ESL system 100. For example, the shelf cameras 104A-104D may be positioned with a field of view that captures one or more shelves of one or more of the gondolas 112A-112H. The shelf cameras 104A-104D may be used to assist in tracking stock levels and/or identifying items picked by users while in the environment. Furthermore, the OTT cameras 102, which may be part of a separate surveillance system of the retail environment 110, may be positioned with different fields of view capturing large areas of the retail environment 110. Object recognition models or systems may be applied to the image frames or other visual information received from the cameras 102A-102D and/or 104A-104D to determine a presence of, or a count of, objects and/or people in the field of view of each camera.

The OTT cameras 102A-102D may be used to support the determination of the positions of the BLE device 124 and/or other devices within the retail environment 110. As described above, the BLE device 124 may be a mobile device that a user carries while moving through the retail environment 110. As the user traverses with the BLE device 124, the BLE device 124 may communicate with the ESL devices 108A-108D, for example, by receiving identification information from the ESL devices 108A-108D. In some embodiments, the BLE device 124 may also be equipped with a camera for capturing ESL devices appearing within the camera's field of view as the user traverses through different areas of the retail environment 110. The location of the ESL devices 108A-108D may be determined by identifying a location of each ESL device within the camera image frames captured by the BLE device 124 at the time the BLE device 124 receives signals and/or the strength of the signals received from the ESL devices 108A-108D at the time the image frames were captured by the BLE device 124 during a survey of the retail environment 110, as will be described in further detail below.

As described above, the retail environment 110 associated with the ESL system 100 may include multiple ESL devices (including ESL devices 108A-108D) organized on shelves of gondolas located throughout the environment 110. One example illustration of such a gondola with an arrangement of ESL devices is shown in FIG. 2A.

Figure 2A:
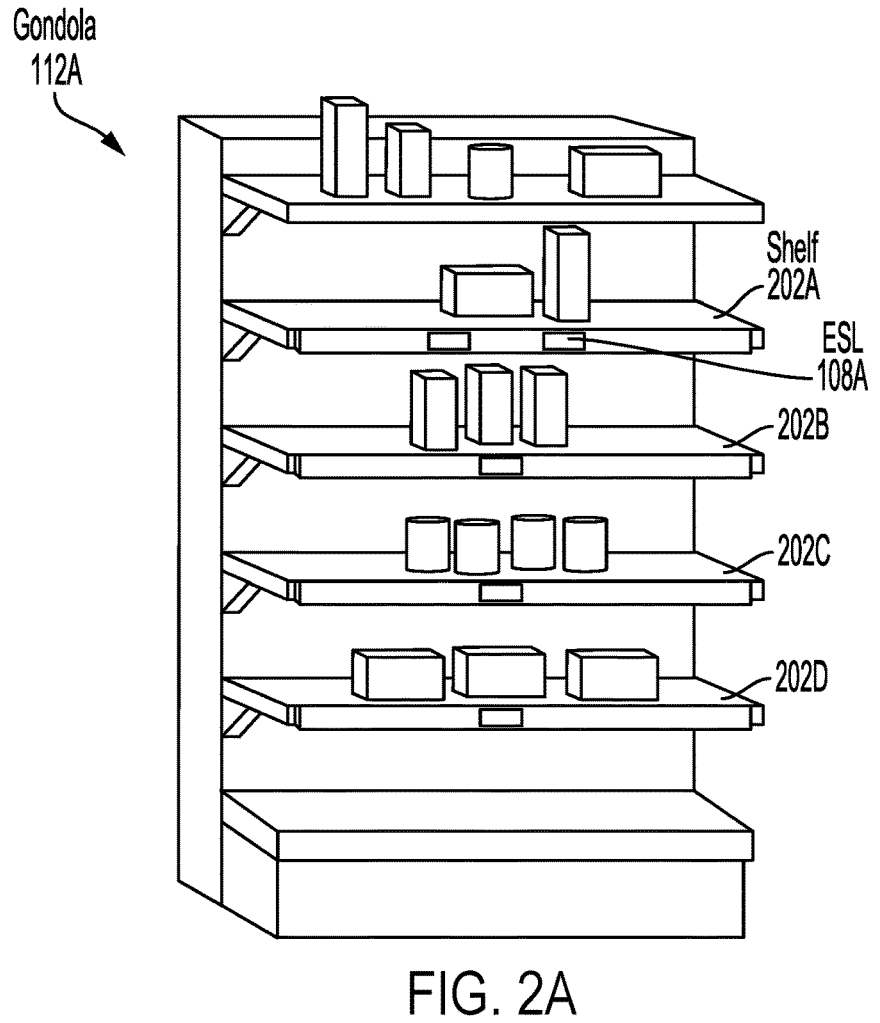
FIG. 2A is a perspective view of a gondola including shelves with ESL devices for displaying information regarding products available for selection by a user within a retail environment according to some embodiments of the disclosure.

FIG. 2A is a perspective view of a gondola 112A with ESL devices arranged on various shelves according to some embodiments of the disclosure. The gondola 112A may include multiple shelves 202A-202D at different vertical levels from a floor. ESL devices may be attached to the shelves 202A-202D. For example, ESL device 108A may be attached to shelf 202A to display information regarding products stocked on shelf 202A in the vicinity of the ESL device 108A.

Figure 2B:
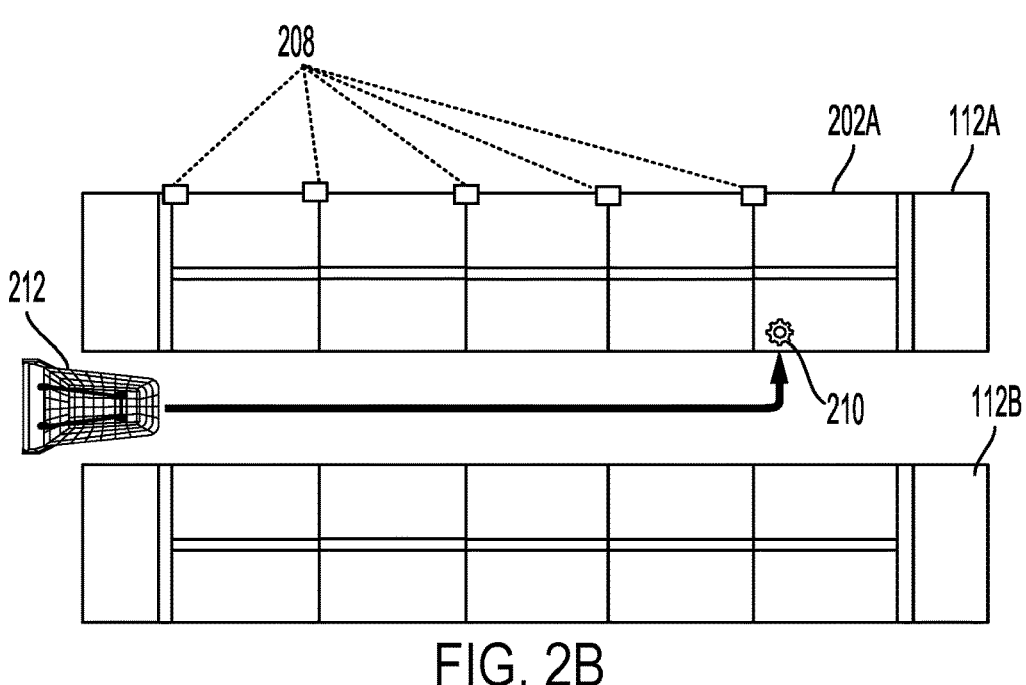
FIG. 2B is a top-down view of an example product region corresponding to an aisle between two gondolas within the retail environment of FIG. 2A according to some embodiments of the disclosure.

The ESL devices may provide information to a shopper or store employee operating in the environment, such as to provide information regarding products and/or assist with location determination of products or the user. FIG. 2B is a top-down view of a retail environment with Electronic Shelf Label (ESL) devices accessible to a user according to some embodiments of the disclosure. As shown in FIG. 2B, gondola 112A may include a dense deployment of ESL devices 208 (including the ESL device 108A of FIG. 2A) in which adjacent ESL devices may be uniformly spaced along the shelf 202A. Additional ESL devices may be similarly positioned along other shelves of gondola 112A and along the shelves of gondola 112B.

A user pushing a shopping cart 212 through the aisle between the gondolas 112A and 112B may use the ESL devices 208 to determine the location of a particular product. For example, a wireless device associated with the shopping cart 212 and/or a mobile device (e.g., BLE device 124 of FIGS. 1A and 1B) of the user may use RF measurements of radio signals broadcasted by the ESL devices 208 (and/or other nearby ESL devices) to estimate a current location of the shopping cart 212 (and user) within the environment and guide the user to a location 210 of a desired product on the appropriate shelf of gondola 112A.

In some embodiments, the shopping cart 212 may be further equipped with a camera, or any image capturing device, for capturing visual information pertaining to an area of the retail environment in which the shopping cart is located. Visual information captured by the camera on the cart and/or other nearby cameras, such as a camera of the user's mobile device (e.g., BLE device 124), may be used to detect one or more features associated with the ESL devices in a surrounding area of the retail environment (e.g., using object detection algorithms or models) during a survey of the environment. The detected features may then be used to determine locations of ESL devices within the retail environment and map the locations to a virtual layout (e.g., a planogram) and/or a real-world layout of the retail environment. The location of the shopping cart 212 may then be estimated based, at least in part, on the known locations of the ESL devices. For example, the visual information from shelf cameras (e.g., shelf cameras 104A-104D of FIG. 1B) and/or OTT cameras (e.g., OTT cameras 102A-102D of FIG. 1B) may be used to narrow down the location of the shopping cart 212 and/or the location of the user to a particular area of the environment corresponding to a field of view of the cameras. This may in turn help to improve an accuracy of the location estimates.

Figure 3:
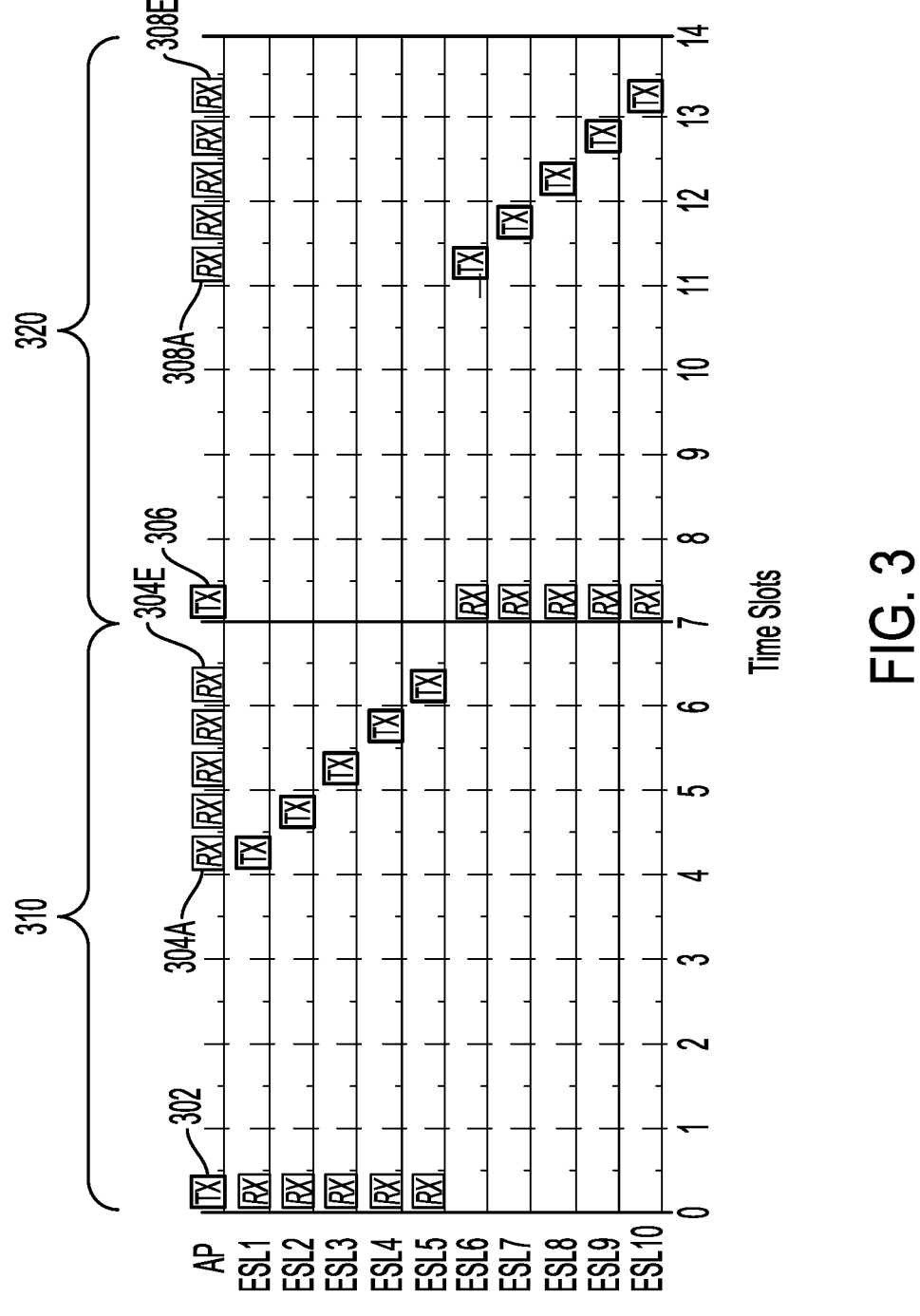
FIG. 3 is a timing diagram illustrating time division multiplexing for communicating with multiple ESL devices according to some embodiments of the disclosure.

In some embodiments, communication between an AP and the ESL devices of an ESL system, such as between the AP 106A and ESL devices 108A-108D of the ESL system 100 of FIG. 1B, may be performed according to a Time Division Multiple Access (TDMA) scheme, as illustrated in FIG. 3. FIG. 3 is a timing diagram illustrating time division multiplexing for communications between an AP and various ESL devices within an ESL system according to some embodiments of the disclosure. As shown in FIG. 3, an AP and each ESL device of the ESL system may be allocated one of various time periods corresponding to different time slots for transmitting or receiving information. It should be appreciated that a similar TDMA scheme may be used for communications between different ESL devices.

In ESL systems with significant numbers of ESL devices, the ESL devices may be configured to communicate with the AP in different groups, where each group may correspond to a different time frame. For example, a first group of ESL devices (ESL1-ESL5) in FIG. 3 may be configured to communicate with the AP during a first time frame 310, and a second group of ESL devices (ESL6-ESL10) may be configured to communicate with the AP during a second time frame 320. The first and second time frames 310 and 320 may alternate during operation of the wireless network. The AP in this example may transmit or broadcast information that is received by the first group of ESL devices during a first time period (or time slot) 302 in the first time frame 310. The ESL devices in this first group may transmit information to the AP during subsequent time periods/slots in the time frame 310. For example, the first ESL device (ESL1) may transmit information received by the AP during a time period 304A, with the other ESL devices (ESL2-ESL5) in this group transmitting during time periods 304B-304E, respectively, in the time frame 310. Likewise, the AP may transmit information received by the second group of ESL devices during a time period 306 in the second time frame 320. The ESL devices (ESL6-ESL10) in this second group may transmit information received by the AP during respective time periods 308A-308E in the time frame 320.

Figure 4:
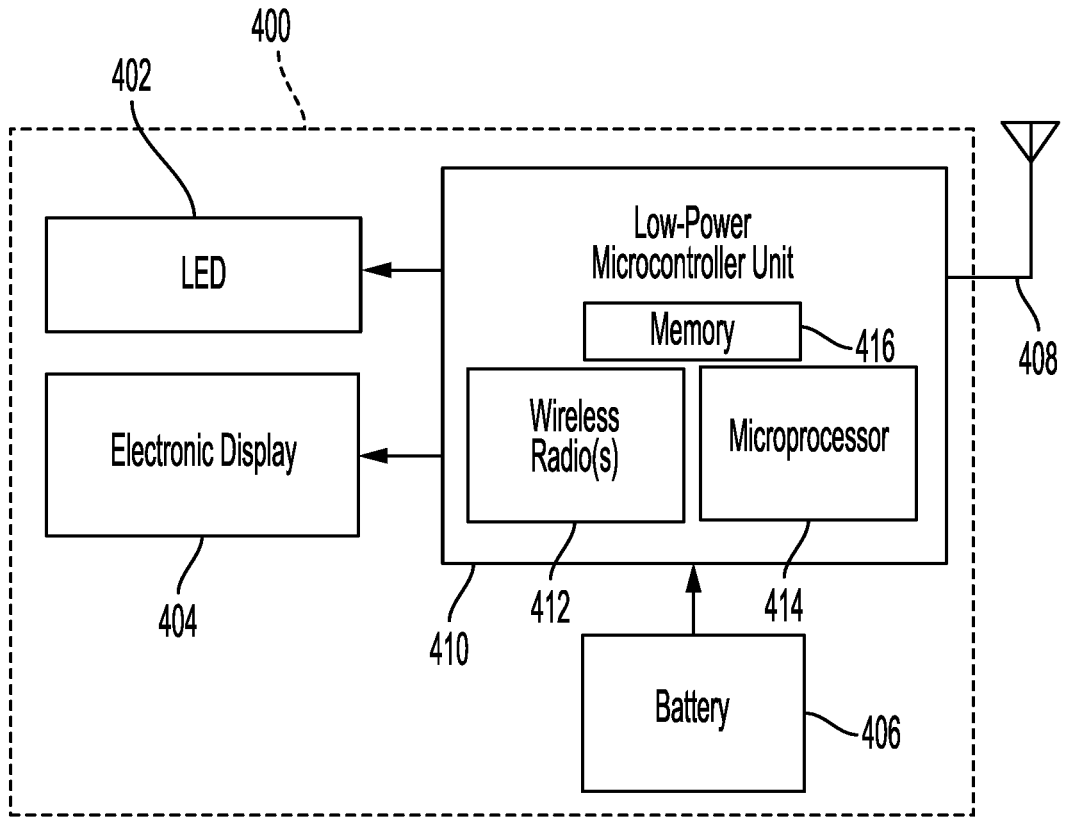
FIG. 4 is a block diagram illustrating an example configuration of an ESL device according to some embodiments of this disclosure.

An ESL device may include components configured together to provide some or all of the functionality described in this disclosure and/or provide additional functionality. FIG. 4 is a block diagram illustrating an example ESL device 400 according to some embodiments of this disclosure. For example, the ESL device 400 may be used to implement each of the ESL devices (including the ESL devices 108A-108D) of the ESL system 100 described above with respect to FIGS. 1A-2B. The ESL device 400 may include a low-power microcontroller 410. Although functionality for the ESL device may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described with respect to various embodiments of this disclosure. Although shown as part of the microcontroller 410, the memory 416 may be located internal to or external to the microcontroller 410. The microcontroller 410 may also include one or more wireless radio(s) 412. The wireless radio(s) 412 may include, for example, a Bluetooth wireless radio including a front end that couples to antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 400 may include I/O devices, such as a light emitting diode (LED) 402 and an electronic display 404. The LED 402 may include one or more light emitting diodes (LEDs), or other light sources configured to flash light of one or more colors. The LED 402 may be triggered to blink at a specific time, for a particular duration (e.g., 10-20 milliseconds), and/or with a specific color based on a command received from the management server 122 via the gateway node 120. For example, a LED 402 may blink to attract a user's attention to a particular location on a shelf. In some implementations, a group of ESL devices may be instructed to flash according to a specified color sequence, where each ESL device flashes at least two different colors in quick succession. The use of such a color sequence may help reduce false alarms because such flashes are extremely unlikely to occur by chance. Furthermore, using different color sequences for flashes by different groups of ESL devices (e.g., with one group flashing a series of two or more colors in a particular order and another group flashing the colors in reverse order) can at least double the number of different LED flashes (and corresponding ESL devices) that can be detected over a flash interval (e.g., one second). For example, extending this concept to flash sequences with at least three different colors may produce an eight-fold increase in detection capacity. The electronic display 404 may be, for example, an electronic-ink (e-ink) display configured to output the product information.

The ESL device 400 may couple to a battery 406 or other power source to power operations performed by the ESL device 400, such as to operate the wireless radio(s) 412, the LED 402, the electronic display 404, the memory 416, and/or the microprocessor 414. The battery 406 may allow placement of the ESL device 400 in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 400 may operate using a wakeup communication scheme. That is, the ESL device 400 wakes up according to predetermined time intervals to determine whether data is waiting to be received. When no data is waiting, power to the ESL device 400 is turned off until the next wakeup period to reduce power consumption. When there is data to be received or transmitted, the ESL device 400 wakes up to perform communication operations.

In some embodiments, the data received by the ESL device 400 may include timing information for synchronizing the LED 402 of the ESL device 400 to emit a flash of light at specified times during a flash interval designated for a group of ESL devices including the ESL device 400. The timing information may include, for example, a first time period at the beginning of the flash interval (or another reference point in the flash interval before or after individual ESL device flashes) when all the ESL devices in the group are to simultaneously emit a first flash of light and a second time period (or subinterval) during the flash interval when each ESL device in the group is to individually emit a second flash of light. The first time period in this example may correspond to a common reference time for the group of ESL devices to emit the first flash, thereby marking the start of a periodic advertising train for the group of ESL devices. The second time period may correspond to a specific timing offset or delay designated for each ESL device in the group to emit the second flash after the first flash at the reference time, thereby marking the position of each ESL device on the periodic advertising train. Each of the ESL devices may be configured to emit the first and second flashes using their respective LEDs or other light sources in a particular color and/or for a particular duration (e.g., 10 ms or other brief duration). In some implementations, each of the ESL devices in the group may also be configured to transmit beacon signals at or about the same time as the second flash.

Figure 5:
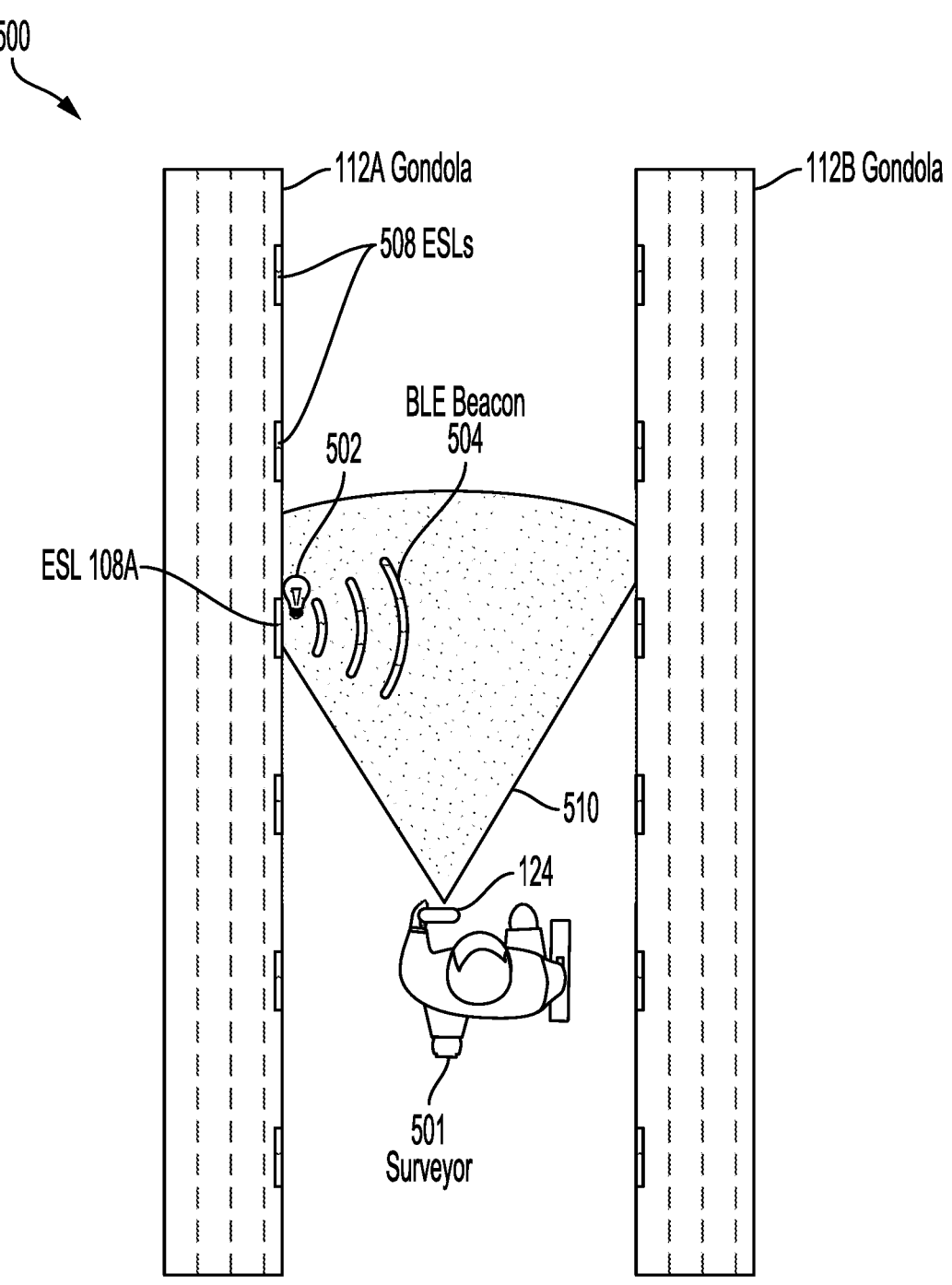
FIG. 5 is a diagram illustrating an example of a survey of an environment using a mobile device for collecting information used to locate ESL devices in the environment according to some embodiments of this disclosure.

The timing (and color) information for the flashes of light emitted during the flash interval/subintervals (and any corresponding beacon signal transmissions) may be included as part of a command sent by the management server 122 to each ESL device in the group for onboarding the group of ESL devices onto the periodic advertising train, e.g., using the periodic advertising sync transfer (PAST) features of the Bluetooth Core Specification described above for periodic advertising over Bluetooth Low Energy, for purposes of data collection during a survey of the retail environment, as will be described in further detail below with reference to FIG. 5.

It is noted that one or more blocks (or operations) described above with reference to FIGS. 1A-4 may be combined with one or more blocks (or operations) described below with reference to one or more of FIGS. 5-7. For discussion purposes, the examples of FIGS. 5-7 will be described below with reference to the ESL devices and other components of the ESL system 100 and/or retail environment 110 of FIGS. 1A-4, as described above. However, it should be appreciated that the disclosed survey-based ESL locating techniques are not intended to be limited thereto and that these techniques may be applied to any of various ESL systems and environments.

FIG. 5 is a diagram illustrating an example of a survey 500 of an environment using a mobile device for collecting information used to locate ESL devices in the environment according to some embodiments of this disclosure. The environment may correspond to, for example, the retail environment 110 of FIG. 1B, as described above, or an area thereof, such as a row of shelves of gondola 112A or an aisle between gondolas 112A and 112B. As shown in the example of FIG. 5, the mobile device may be implemented using the BLE device 124 of FIGS. 1A and 1B, as described above. Each of the ESL devices in this example may be implemented using the configuration of ESL device 400 of FIG. 4, as described above.

The BLE device 124 in this example may function as a survey device operated by a human surveyor 501 (e.g., a retail store worker) who carries the BLE device 124 to collect information pertaining to a group of ESL devices located in a vicinity of the BLE device 124 while traveling through the environment during the survey 500. In some implementations, the BLE device 124 may be operated or carried by an autonomous robot that travels through the environment for the same purpose. The group of ESL devices may include, for example, ESL device 108A and one or more neighboring ESL devices (or "ESLs") 508 located along the gondola 112A.

During the survey 500, each ESL device in the group may emit one or more flashes of light at specified times or time periods over a flash interval designated by a server (e.g., management server 122 of FIG. 1B, as described above) of the corresponding ESL system for the group of ESL devices. For example, the ESL device 108A may use its LED (e.g., LED 402 of FIG. 4, as described above) or other light source to emit a flash 502 for a specified duration (e.g., 10-20 ms) at a specified time during the flash interval. The specified time for the flash 502 may be based on, for example, a specific offset or delay that is relative to the start of the flash interval and that is assigned to the ESL device 108A according to its position on a periodic advertising train associated with the group of ESL devices, as described above. In some embodiments, the ESL device 108A may also transmit a BLE beacon signal (or "BLE beacon") 504 at the same time as the flash 502.

The BLE device 124 may be equipped with a digital camera having a field of view 510 that captures visual data (e.g., images or video frames) for the flash 502 emitted by the ESL device 108A as the surveyor 501 moves with the BLE device 124 through the environment. The BLE device 124 may also be equipped with a wireless radio for collecting RF measurements of the BLE beacon 504 signal at the same time the visual data is captured. The BLE device 124 may also capture visual data (e.g., a sequence of image frames) for the ESLs 508, as they individually flash their LEDs and appear within the camera's field of view 510, along with RF measurements of their respective BLE beacon transmissions at corresponding times (or subintervals) during the designated flash interval. The BLE beacon transmitted by each ESL device (including the BLE beacon 504 transmitted by the ESL device 108A) in this group may include identity information about the ESL device from which the beacon originated or was transmitted.

The flash emitted by each ESL device (including the flash 502 emitted by the ESL device 108A) may indicate a location of that ESL device within a corresponding image frame captured by the camera of the BLE device 124 for that ESL device. In some embodiments, the image frame captured for each ESL device in the sequence of image frames captured by the camera of the BLE device 124 for the group of ESL devices may include a timestamp indicating the time at which the flash emitted by the ESL device occurs relative to the start time of the flash interval associated with the group. The information (including the visual data and RF measurements) captured by the BLE device 124 for each ESL device in the group during the survey 500 may be provided to a server of the ESL system for post-processing.

In some embodiments, the server may post-process the survey information using structure-from-motion techniques to determine a location and/or a pose (e.g., a position and orientation) of the camera within each image or video frame. The location and/or pose of the camera may be expressed as, for example, x-y-z coordinates within a three-dimensional (3D) coordinate space representing a structure-from-motion map of the environment (or corresponding area thereof). The camera location/pose may be combined with the ESL location indicated by the visual data (e.g., by the location of the flash within the image frame) captured for each ESL device (as identified by the BLE beacon captured at a corresponding time) to determine coordinates for a location of the ESL device within the 3D coordinate space. In some embodiments, the visual data captured by the camera of the BLE device 124 for at least a portion of the environment may be supplemented with or replaced by visual information captured within a field of view of one or more OTT cameras (e.g., OTT cameras 102 of FIG. 1B) associated with a surveillance system or stock monitoring system of the environment. For example, given a pose of each OTT camera, the visual data from multiple OTT cameras may be used to detect the flashes corresponding to all the ESL devices within their respective fields of view. In some embodiments, the visual data and/or the RF measurements obtained during the survey may be processed and used to identify each ESL device in real time, prior to determining the location of the ESL device during post-processing. By separating the processing of the identity information from the relatively more complex data processing associated with the location determination, the ESL system can focus the remainder of the survey on any ESL devices within the environment that are still undetected or unidentified. This in turn allows the ESL system to appropriately allocate flash intervals and time slots for only those undetected ESLs and thereby complete the survey in a more efficient manner.

Figure 6:
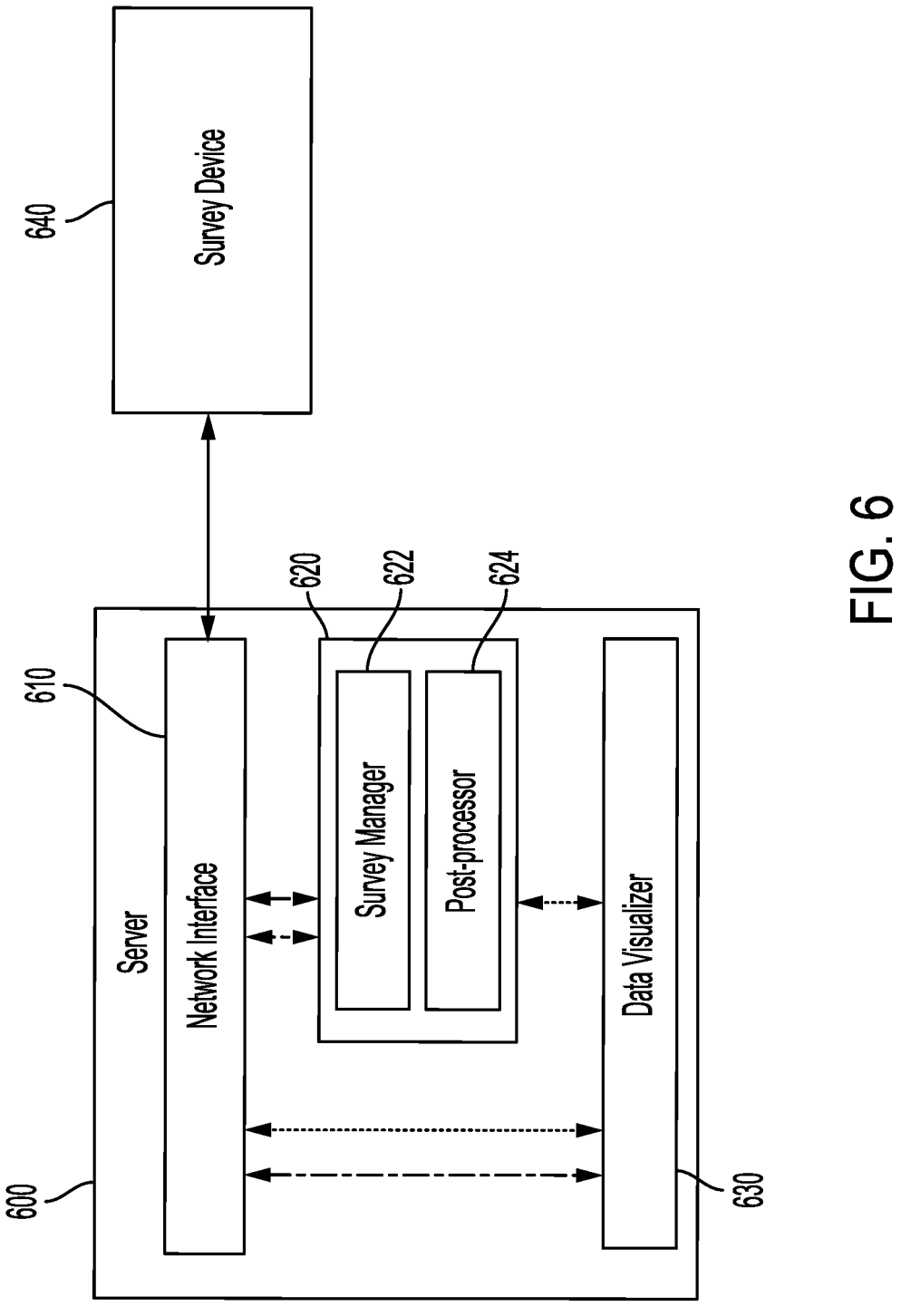
FIG. 6 is a block diagram of an example server for locating ESL devices in an environment based, at least in part, on visual data acquired by a camera of a mobile device during a survey of the environment according to some embodiments of this disclosure.

FIG. 6 is a block diagram of an example server 600 for locating ESL devices in an environment based, at least in part, on visual data acquired by a camera of a mobile device (e.g., BLE device 124 of FIG. 5, as described above) during a survey of the environment according to some embodiments of this disclosure. The server 600 may be used to implement, for example, a management server of an ESL system (e.g., management server 122 of the ESL system 100 of FIG. 1B, as described above) deployed within an environment (e.g., retail environment 110 of FIGS. 1A and 1B, as described above). As shown in FIG. 6, the server 600 includes a network interface 610, an ESL locator 620, and a data visualizer 630. The ESL locator 620 may include a survey manager 622 and a post-processor 624. As will be described in further detail below, the survey manager 622 may be used to orchestrate the actions of the ESL devices for data collection by a survey device 640 during a survey of the environment (or relevant area thereof), and the post-processor 624 may be used to post-process the data collected by the survey device 640 during the survey.

In some embodiments, the survey device 640 may be a mobile device (e.g., the BLE device 124 of FIGS. 1A and 1B, as described above) equipped with a camera for collecting visual data (e.g., a sequence of images and/or video frames) associated with ESL devices appearing within a field of view of the camera during the survey, as described above. Additionally, the survey device 640 may be equipped with and a wireless radio (e.g., a Bluetooth Low Energy (BLE) radio) for collecting radio frequency (RF) measurements of beacon signals (e.g., BLE beacons) received from ESL devices in a vicinity of the survey device 640. In some embodiments, an ESL beacon including an ESL identifier (ID) or other information identifying a particular ESL device may be received by the survey device 640 at or around the same time an image or video frame for the ESL device is captured by the camera of the survey device 640.

The server 600 and its components or subcomponents (including the survey manager 622 and the post-processor 624 of the ESL locator 620) may use the network interface 610 to communicate with the survey device 640 and each of the ESL devices located within the environment via a communication network. Such a network may be any network or combination of networks that can carry data communications according to any of various communication standards. The network may include, but is not limited to, a wired or a wireless network. The network may also include a local area network, a medium area network, or a wide area network, such as the Internet. The network and network interface 610 may support any of various networking protocols and technologies as desired for a particular implementation.

In some embodiments, the survey manager 622 may use RF measurements of ESL beacons received from the survey device 640 via the network interface 610 to identify a group of ESL devices in a vicinity of the survey device 640. The group identified by the survey manager 622 may include, for example, an initial set of ESL devices for which the RF measurements (e.g., received signal strength indicator (RSSI) values) are the strongest and thus, most likely to appear within a field of view of the survey device 640's camera. The survey manager 622 may also identify additional ESL devices in the vicinity of the survey device 640 based on additional RF measurements received from each ESL device in the initial set. The additional RF measurements may be based on beacon signals received by each initial ESL device from one or more of its neighboring ESL devices. Such ESL-to-ESL measurements allow the survey manager 622 to identify any neighboring ESL device for which the initial RF measurements received from the survey device 640 are too weak or unavailable, e.g., due to physical obstructions or other environmental conditions affecting signal propagation between the survey device 640 and the neighboring ESL device(s).

In some embodiments, the survey manager 622 may initiate the survey for the group of ESL devices, as identified from the RF measurements received from the survey device 640 and the ESL-to-ESL measurements from neighboring ESL devices, as described above. The survey manager 622 may then transmit a command to each ESL device in the group to emit a flash of light using a light source (e.g., such as LED 402 of ESL device 400, as shown in FIG. 4 described above) of the ESL device at specified times or time slots corresponding to different subintervals of a flash interval designated for the group during the survey.

As each ESL device emits the flash at its specified time slot during the survey, the camera of the survey device 640 may capture a corresponding image frame or video frame of the ESL device including the flash emitted by its LED or light source. As described above, the specified time slot for each ESL device may be a time period lasting a short duration, e.g., 10-20 milliseconds, during the designated flash interval. Keeping the duration of each time slot (or subinterval) relatively short allows a greater number of ESL devices and corresponding flashes to be captured in the visual data. For example, flash the ESL LEDs for only 10 milliseconds allows flashes from 100 different ESL devices to be captured over the course of a flash interval lasting one second. Also, as described above, the timing information for each ESL device may be used to synchronize the timing of the individual flashes emitted by the group of ESL devices according to a specified offset or delay relative to a common reference time at the start of the designated flash interval for the group. For example, the offset assigned to each ESL device in the group may be incremented according to an order in which the ESL devices are instructed to flash, where the ESL device estimated to be located nearest to the survey device 640 is instructed first, followed by the second nearest, and so on. The order of the ESL devices may be determined based on the relative strength of the ESL beacons received by the survey device 640 (where the nearest ESL device produces the strongest ESL beacons), as indicated by the initial RF measurements received by the survey manager 622 from the survey device 640, as well as any ESL-to-ESL measurements received from one or more ESL devices for neighboring ESL devices, as described above.

In some embodiments, the survey manager 622 may identify different groups of ESL devices deployed within different areas of the environment, and a different sequence of image frames may be collected for each group as the survey device 640 moves through the first and second areas during the survey. For example, a first sequence of image frames may be collected by the camera of the survey device 640 during a first flash interval associated with the first group, and a second sequence of image frames may be collected by the camera during a second flash interval, associated with the second group. In some implementations, a single flash interval may be designated for the first and second groups, and each the ESL devices in these groups may be allocated a different time slot to emit a flash over the same flash interval. For example, if each group includes three ESL devices, then the first group of three ESL devices may be allocated time slots 1, 2, and 3, respectively, over the flash interval, and the second group of three ESL devices may be allocated time slots 4, 5, and 6, respectively, over the flash interval.

To distinguish the common reference point in the visual data (e.g., sequence of image frames) captured by the survey device 640 during the post-processing operations to be performed by the post-processor 624, all the ESL devices in a group may be instructed by the survey manager 622 to perform a synchronous flash at the same time (e.g., by simultaneously flashing their respective LEDs at the common reference time). The individual flash emitted thereafter by each ESL device at the specified offset may be used to distinguish the individual ESL devices from one another based on the order in which the ESL devices in the group were instructed, as described above. In some embodiments, each ESL device may also be configured to transmit a beacon (e.g., similar to BLE beacon 504 of FIG. 5, as described above) including its identification information (e.g., a unique ESL ID corresponding to the ESL device) at the same time (or time period) specified for the flash. The ESL beacon and ID information received by the survey device 640 at the specified time may be used as an alternative to using the common reference time and timing offset to distinguish the individual ESL device flashes in the visual data collected by the camera of the survey device 640.

In some implementations, the survey manager 622 may vary the frequency of the light emitted by the LED of each ESL device to produce different colors of light or different wavelengths of light. In addition to visible light, for example, the ESL devices may be capable of producing infrared light, ultraviolet light, or other forms of light at wavelengths invisible to the naked eye to avoid producing any visual disturbances within the environment. Each color option that may be available for the individual flashes of light produced by the ESL devices may be treated as a separate channel by the survey manager 622 to improve system capacity in terms of the number of ESL devices that can be identified during each flash interval (e.g., lasting one second). By using multiple LEDs, the capacity may increase by a factor of two with each additional LED. The additional capacity may alternatively be used to reduce the timing requirement for a fixed number of LEDs. Furthermore, using different colored LEDs for ESL devices installed at known separate locations on a shelf or along a rail of a gondola may allow the flashes produced by these LEDs to be seen in the same image captured by the camera of the survey device 640, and thereby provide a measure of scale that can be used to assist the post-processing of the survey data performed by the post-processor 624, as will be described below.

In some embodiments, the post-processor 624 may perform survey post-processing by applying structure-from-motion (SFM) techniques to analyze the visual data and other information collected and reported by the survey device 640 during the survey. For example, the post-processor 624 may analyze each image or video frame to detect distinctive features within each frame. Examples of such features include, but are not limited to, points, corners, edges, or other distinguishable patterns that are common across multiple frames. In some implementations, the post-processor 624 may use a scale-invariant feature transform (SIFT) to detect and match local features from one frame to the next. The flashes of light emitted by the ESL devices may be uniquely identifiable point sources for the corresponding ESL devices within the frames processed by the post-processor 624. Thus, the ESL flashes may serve as reliable (or highly reliable) features that may be used to augment or replace other image derived features (e.g., SIFT features). Reducing the number of such features has the potential to significantly reduce the computational requirements for the structure-from-motion processing performed by the post-processor 624 while preserving its functionality and performance.

In some embodiments, the post-processor 624 may determine a location of each ESL device in the first group relative to a location and/or a pose (e.g., position and/or orientation) of the camera within the environment based on the flash detected for that ESL device in the visual data (e.g., within a corresponding image frame captured by the camera of the survey device 640).

The output of the post-processing performed by the post-processor 624 may include, for example, a point cloud with the locations of the ESL devices marked (e.g., as x-y-z coordinates within a three-dimensional (3D) coordinate space representing a structure-from-motion map of the environment or particular area thereof in which the ESL devices are located). The data visualizer 630 may then be used to visualize the point cloud may onto a map of the environment. As described above, the environment may be a retail environment associated with a store or distribution warehouse. Accordingly, the visualized map including the locations of the ESL device map as applied to a map of the store may be used to provide users (e.g., retail store customers) with indoor positioning and navigation services, e.g., for locating a desired product on a shelf of a gondola in a particular area of the retail environment, as described above with respect to FIGS. 2A and 2B.

FIG. 7 is a flow chart of an example method 700 for locating ESL devices in an environment based, at least in part, on visual data acquired by a camera of a mobile device during a survey of the environment according to some embodiments of this disclosure. For discussion purposes, method 700 will be described using the ESL system 100 of FIG. 1B, as described above, and/or the server 600 of FIG. 6, as described above. However, the method 700 is not intended to be limited thereto. For example, method 700 including the operations in the blocks described below may be performed by the management server 122 of the ESL system 100, as described above, or by components of the server 600 of FIG. 6, as described above.

Method 700 begins at block 702, which includes receiving, from a mobile device via a wireless network, radio frequency (RF) measurements of wireless signals received by the mobile device from ESL devices deployed within an environment (e.g., retail environment 110 of FIG. 1B) during a survey of the environment.

At block 704, a group of the ESL devices in a vicinity of the mobile device is identified, based on the RF measurements received at block 702.

At block 706, a command is transmitted via the wireless network to each ESL device in the group to emit a flash of light at a time (or time period) designated for that ESL device during a flash interval associated with the group.

At block 708, visual data collected for the group by a camera of the mobile device during the flash interval is received from the mobile device via the wireless network.

Method 700 then proceeds to block 710, which includes detecting, within the visual data, the flash that was emitted by each ESL device in the group at the designated time during the flash interval.

At block 712, a location of each ESL device in the group relative to a pose of the camera within the environment is determined based on the flash detected for that ESL device in the visual data.

In some embodiments, different groups of ESL devices may be deployed in different areas of the environment. For example, the group of ESL devices for which the locations are determined at block 712 may be a first group of ESL devices deployed within a first area of the environment. The visual data received for this first group at block 708 above may include a first sequence of image frames collected by the camera of the mobile device during the flash interval associated with the first group. Additional visual data (including a second sequence of image frames) collected by the camera for a second group of ESL devices deployed within a second area of the environment may be received (at block 708) as the mobile device moves through the first and second areas during the survey. The second sequence of image frames may be collected by the camera during a different flash interval associated with the second group. The operations at block 710 and 712 may then be repeated to determine the location of each ESL device in the second group within the environment based on a corresponding flash detected for that ESL device in the additional visual data (or second sequence of image frames).

In one or more aspects, techniques for supporting ESL systems may include additional aspects, such as any single aspect or any combination of aspects described below or in connection with one or more other processes or devices described elsewhere herein.

In a first aspect, a method comprises: transmitting, by a server to each electronic shelf label (ESL) device in a group of ESL devices deployed within an environment via a wireless network associated with the environment, a command to emit one or more flashes of light over a flash interval associated with the group; receiving, by the server from a mobile device via the wireless network, visual data collected for the group by a camera during the flash interval; detecting, by the server within the visual data, the one or more flashes emitted by each ESL device in the group over the flash interval; and determining, by the server, a location within the environment of each ESL device in the group based on the one or more flashes emitted by each ESL device in the visual data.

In a second aspect, in combination with the first aspect, the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein detecting further comprises: receiving, by the server from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

In a third aspect, in combination with one or more of the first aspect or the second aspect, each ESL device in the group is in a vicinity of the mobile device during a survey of the environment, and wherein the method further comprises: receiving, by the server from the mobile device via the wireless network during the survey, radio frequency (RF) measurements of wireless signals received by the mobile device from a subset of the ESL devices deployed within the environment; and identifying, by the server, each ESL device in the group, based on the RF measurements received for the subset.

In a fourth aspect, in combination with one or more of the first aspect through the third aspect, the identifying further comprises: receiving, by the server from at least one ESL device in the group, additional RF measurements of beacons transmitted by one or more neighboring ESL devices; and identifying, by the server, the group of ESL devices in the vicinity of the mobile device, based on the RF measurements received from the mobile device and the additional RF measurements received from the at least one ESL device.

In a fifth aspect, in combination with one or more of the first aspect through the fourth aspect, the one or more flashes include a first flash emitted simultaneously by all the ESL devices in the group at a start of the flash interval and a second flash emitted individually by each ESL device in the group after a specified delay from the start of the flash interval, wherein the method further comprises: detecting, within the visual data, the first flash emitted by all the ESL devices in the group and the second flash emitted by each ESL device in the group after the first flash; and determining a common reference time corresponding to the start of the flash interval for the group based on the first flash detected within the visual data; and identifying each ESL device in the group based on the specified delay corresponding to that ESL device and a timing of the second flash detected within the visual data relative to the common reference time.

In a sixth aspect, in combination with one or more of the first aspect through the fifth aspect, the visual data includes an image frame collected by the camera for each ESL device in the group during a survey of the environment.

In a seventh aspect, in combination with one or more of the first aspect through the sixth aspect, different groups of ESL devices are deployed in different areas of the environment, wherein the group of ESL devices is a first group of ESL devices deployed within a first area of the environment, wherein a second group of ESL devices is deployed within a second area of the environment, wherein the visual data includes a first sequence of image frames and a second sequence of image frames collected by the camera for the respective first and second groups as the mobile device moves through the first and second areas during the survey, and wherein the first sequence is collected by the camera during the flash interval associated with the first group, and wherein the second sequence is collected by the camera during a different flash interval associated with the second group.

In an eighth aspect, in combination with one or more of the first aspect through the seventh aspect, wherein the location of each ESL device in the group is expressed as a set of coordinates relative to a pose of the camera within a three-dimensional (3D) coordinate space representing the environment.

In a ninth aspect, in combination with one or more of the first aspect through the eighth aspect, the set of coordinates for each ESL device is determined using structure-from-motion analysis of the visual data.

In a tenth aspect, in combination with one or more of the first aspect through the ninth aspect, the one or more flashes detected in the visual data include a flash of light emitted by each ESL device in the group over the flash interval, wherein the visual data includes a sequence of image frames collected by the camera for the group over the flash interval, wherein each image frame in the sequence corresponds to a different ESL device in the group, and wherein determining the location of each ESL device comprises: applying an image filter to detect the flash of light emitted by the ESL device at a point within a corresponding image frame; and mapping the point within the corresponding image frame to the set of coordinates within the 3D coordinate space.

In an eleventh aspect, an apparatus includes a memory storing processor-readable code and at least one processor coupled to the memory, wherein the at least one processor configured to execute the processor-readable code to cause the at least one processor to perform operations comprising: transmitting, to each electronic shelf label (ESL) device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

In a twelfth aspect, in combination with the eleventh aspect, the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise: receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

In a thirteenth aspect, in combination with one or more of the eleventh aspect or the twelfth aspect, each ESL device in the group is in a vicinity of the mobile device during a survey of the environment, wherein the operations further comprise: receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

In a fourteenth aspect, in combination with one or more of the eleventh aspect through the thirteenth aspect, the operations for identifying further comprise: receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

In a fifteenth aspect, in combination with one or more of the eleventh aspect through the fourteenth aspect, the one or more flashes include a first flash emitted simultaneously by all the ESL devices in the group at a start of the flash interval and a second flash emitted individually by each ESL device in the group after a specified delay from the start of the flash interval, wherein the operations further comprise: detecting, within the visual data, the first flash emitted by all the ESL devices in the group and the second flash emitted by each ESL device in the group after the first flash; determining a common reference time corresponding to the start of the flash interval for the group based on the first flash detected within the visual data; and identifying each ESL device in the group based on the specified delay corresponding to that ESL device and a timing of the second flash detected within the visual data relative to the common reference time.

In a sixteenth aspect, in combination with one or more of the eleventh aspect through the fifteenth aspect, the visual data includes an image frame collected by the camera for each ESL device in the group during a survey of the environment.

In a seventeenth aspect, in combination with one or more of the eleventh aspect through the sixteenth aspect, different groups of ESL devices are deployed in different areas of the environment, wherein the group of ESL devices is a first group of ESL devices deployed within a first area of the environment, wherein a second group of ESL devices is deployed within a second area of the environment, wherein the visual data includes a first sequence of image frames and a second sequence of image frames collected by the camera for the respective first and second groups as the mobile device moves through the first and second areas during the survey, and wherein the first sequence is collected by the camera during the flash interval associated with the first group, and wherein the second sequence is collected by the camera during a different flash interval associated with the second group.

In an eighteenth aspect, in combination with one or more of the eleventh aspect through the seventeenth aspect, the location of each ESL device in the group is expressed as a set of coordinates relative to a pose of the camera within a three-dimensional (3D) coordinate space representing the environment.

In a nineteenth aspect, in combination with one or more of the eleventh aspect through the eighteenth aspect, the set of coordinates for each ESL device is determined using structure-from-motion analysis of the visual data.

In a twentieth aspect, in combination with one or more of the eleventh aspect through the nineteenth aspect, the one or more flashes detected in the visual data include a flash of light emitted by each ESL device in the group over the flash interval, wherein the visual data includes a sequence of image frames collected by the camera for the group over the flash interval, wherein each image frame in the sequence corresponds to a different ESL device in the group, and wherein the operations for determining the location of each ESL device comprise: applying an image filter to detect the flash of light emitted by the ESL device at a point within a corresponding image frame; and mapping the point within the corresponding image frame to the set of coordinates within the 3D coordinate space.

In a twenty-first aspect, a non-transitory computer-readable medium stores instructions that, when executed by a processor, cause the processor to perform operations comprising: transmitting, to each electronic shelf label (ESL) device in a group of ESL devices deployed within an environment via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

In a twenty-second aspect, in combination with the twenty-first aspect, the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise: receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

In a twenty-third aspect, in combination with one or more of the twenty-first aspect or the twenty-second aspect, each ESL device in the group is in a vicinity of the mobile device during a survey of the environment, and wherein the operations further comprise: receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

In a twenty-fourth aspect, in combination with one or more of the twenty-first aspect through the twenty-third aspect, the operations for identifying further comprise: receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

In a twenty-fifth aspect, in combination with one or more of the twenty-first aspect through the twenty-fourth aspect, the one or more flashes include a first flash emitted simultaneously by all the ESL devices in the group at a start of the flash interval and a second flash emitted individually by each ESL device in the group after a specified delay from the start of the flash interval, and wherein the operations further comprise: detecting, within the visual data, the first flash emitted by all the ESL devices in the group and the second flash emitted by each ESL device in the group after the first flash; determining a common reference time corresponding to the start of the flash interval for the group based on the first flash detected within the visual data; and identifying each ESL device in the group based on the specified delay corresponding to that ESL device and a timing of the second flash detected within the visual data relative to the common reference time.

In a twenty-sixth aspect, an electronic shelf label (ESL) system comprises: a group of ESL devices deployed within an environment; and a server comprising a memory and at least one processor coupled to the memory, wherein the at least one processor is configured to perform operations comprising: transmitting, to each ESL device in the group via a wireless network associated with the environment, a command to emit one or more flashes of light over a flash interval associated with the group; receiving, from a mobile device via the wireless network, visual data collected for the group by a camera during the flash interval; detecting, within the visual data, the one or more flashes emitted by each ESL device in the group over the flash interval; and determining a location within the environment of each ESL device in the group based on the one or more flashes emitted by each ESL device in the visual data.

In a twenty-seventh aspect, in combination with the twenty-sixth aspect, the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise: receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

In a twenty-eighth aspect, in combination with the twenty-sixth aspect, each ESL device in the group is in a vicinity of the mobile device during a survey of the environment, wherein the operations further comprise: receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

In a twenty-ninth aspect, in combination with one or more of the twenty-sixth aspect or the twenty-eighth aspect, the operations for identifying further comprise: receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

In a thirtieth aspect, in combination with one or more of the twenty-sixth aspect through the twenty-ninth aspect, the one or more flashes include a first flash emitted simultaneously by all the ESL devices in the group at a start of the flash interval and a second flash emitted individually by each ESL device in the group after a specified delay from the start of the flash interval, and wherein the operations further comprise: detecting, within the visual data, the first flash emitted by all the ESL devices in the group and the second flash emitted by each ESL device in the group after the first flash; determining a common reference time corresponding to the start of the flash interval for the group based on the first flash detected within the visual data; and identifying each ESL device in the group based on the specified delay corresponding to that ESL device and a timing of the second flash detected within the visual data relative to the common reference time.

Components, the functional blocks, and the modules described herein with respect to the figures described above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method comprising:
transmitting, by a server to each electronic shelf label (ESL) device in a group of ESL devices deployed within an environment via a wireless network associated with the environment, a command to emit one or more flashes of light over a flash interval associated with the group;

receiving, by the server from a mobile device via the wireless network, visual data collected for the group by a camera during the flash interval;

detecting, by the server within the visual data, the one or more flashes emitted by each ESL device in the group over the flash interval; and determining, by the server, a location within the environment of each ESL device in the group based on the one or more flashes emitted by each ESL device in the visual data;

wherein each ESL device in the group is in a vicinity of the mobile device during a survey of the environment, and wherein the method further comprises:

receiving, by the server from the mobile device via the wireless network during the survey, radio frequency (RF) measurements of wireless signals received by the mobile device from a subset of the ESL devices deployed within the environment; and identifying, by the server, each ESL device in the group, based on the RF measurements received for the subset.

2. The method of claim 1, wherein the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein detecting further comprises:

receiving, by the server from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

3. The method of claim 1, wherein the one or more flashes include a first flash emitted simultaneously by all the ESL devices in the group at a reference point of the flash interval and second flashes emitted individually by individual ESL devices in the group at specified differences from the reference point of the flash interval, and wherein the method further comprises:

detecting, within the visual data, the first flash emitted by all the ESL devices in the group and the second flashes emitted by each ESL device in the group after the first flash;

determining a common reference time corresponding to the reference point of the flash interval for the group based on the first flash detected within the visual data; and identifying each ESL device in the group based on a specified difference corresponding to each ESL device and a timing of a second flash corresponding to each ESL device detected within the visual data relative to the common reference time.

4. The method of claim 1, wherein the visual data includes an image frame collected by the camera for each ESL device in the group during a survey of the environment.

5. The method of claim 4, wherein different groups of ESL devices are deployed in different areas of the environment, wherein the group of ESL devices is a first group of ESL devices deployed within a first area of the environment, wherein a second group of ESL devices is deployed within a second area of the environment, wherein the visual data includes a first sequence of image frames and a second sequence of image frames collected by the camera for the respective first and second groups as the mobile device moves through the first and second areas during the survey, and wherein the first sequence is collected by the camera during the flash interval associated with the first group, and wherein the second sequence is collected by the camera during a different flash interval associated with the second group.

6. The method of claim 1, wherein the location of each ESL device in the group is expressed as a set of coordinates relative to a pose of the camera within a three-dimensional (3D) coordinate space representing the environment.

7. The method of claim 6, wherein the set of coordinates for each ESL device is determined using structure-from-motion analysis of the visual data.

8. The method of claim 7, wherein the one or more flashes detected in the visual data include a flash of light emitted by each ESL device in the group over the flash interval, wherein the visual data includes a sequence of image frames collected by the camera for the group over the flash interval, wherein each image frame in the sequence corresponds to a different ESL device in the group, and wherein determining the location of each ESL device comprises:

applying an image filter to detect the flash of light emitted by the ESL device at a point within a corresponding image frame; and mapping the point within the corresponding image frame to the set of coordinates within the 3D coordinate space.

9. The method of claim 1, wherein the identifying further comprises:

receiving, by the server from at least one ESL device in the group, additional RF measurements of beacons transmitted by one or more neighboring ESL devices; and identifying, by the server, the group of ESL devices in the vicinity of the mobile device, based on the RF measurements received from the mobile device and the additional RF measurements received from the at least one ESL device.

10. An apparatus comprising:

a memory storing processor-readable code; and at least one processor coupled to the memory, the at least one processor configured to execute the processor-readable code to cause the at least one processor to perform operations comprising:

transmitting, to each electronic shelf label (ESL) device in a group of ESL devices deployed within an environment via a wireless network associated with the environment, a command to emit one or more flashes of light over a flash interval associated with the group;

receiving, from a mobile device via the wireless network, visual data collected for the group by a camera during the flash interval;

detecting, within the visual data, the one or more flashes emitted by each ESL device in the group over the flash interval; and determining a location within the environment of each ESL device in the group based on the one or more flashes emitted by each ESL device in the visual data;

wherein each ESL device in the group is in a vicinity of the mobile device during a survey of the environment, and wherein the operations further comprise:

receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

11. The apparatus of claim 10, wherein the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise:

receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

12. The apparatus of claim 10, wherein the one or more flashes include a first flash emitted simultaneously by all the ESL devices in the group at a reference point of the flash interval and second flashes emitted individually by individual ESL devices in the group at specified differences from the reference point of the flash interval, and wherein the processor is configured to perform further operations comprising:

detecting, within the visual data, the first flash emitted by all the ESL devices in the group and the second flashes emitted by each ESL device in the group after the first flash;

determining a common reference time corresponding to the reference point of the flash interval for the group based on the first flash detected within the visual data; and identifying each ESL device in the group based on a specified difference corresponding to each ESL device and a timing of a second flash corresponding to each ESL device detected within the visual data relative to the common reference time.

13. The apparatus of claim 10, wherein the visual data includes an image frame collected by the camera for each ESL device in the group during a survey of the environment.

14. The apparatus of claim 13, wherein different groups of ESL devices are deployed in different areas of the environment, wherein the group of ESL devices is a first group of ESL devices deployed within a first area of the environment, wherein a second group of ESL devices is deployed within a second area of the environment, wherein the visual data includes a first sequence of image frames and a second sequence of image frames collected by the camera for the respective first and second groups as the mobile device moves through the first and second areas during the survey, and wherein the first sequence is collected by the camera during the flash interval associated with the first group, and wherein the second sequence is collected by the camera during a different flash interval associated with the second group.

15. The apparatus of claim 10, wherein the location of each ESL device in the group is expressed as a set of coordinates relative to a pose of the camera within a three-dimensional (3D) coordinate space representing the environment.

16. The apparatus of claim 15, wherein the set of coordinates for each ESL device is determined using structure-from-motion analysis of the visual data.

17. The apparatus of claim 16, wherein the one or more flashes detected in the visual data include a flash of light emitted by each ESL device in the group over the flash interval, wherein the visual data includes a sequence of image frames collected by the camera for the group over the flash interval, wherein each image frame in the sequence corresponds to a different ESL device in the group, and wherein the operations for determining the location of each ESL device comprise:

applying an image filter to detect the flash of light emitted by the ESL device at a point within a corresponding image frame; and mapping the point within the corresponding image frame to the set of coordinates within the 3D coordinate space.

18. The apparatus of claim 10, wherein the operations for identifying further comprise:

receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

19. A non-transitory computer-readable medium storing instructions that, when executed by a processor, cause the processor to perform operations comprising:

transmitting, to each electronic shelf label (ESL) device in a group of ESL devices deployed within an environment via a wireless network associated with the environment, a command to emit one or more flashes of light over a flash interval associated with the group;

receiving, from a mobile device via the wireless network, visual data collected for the group by a camera during the flash interval;

detecting, within the visual data, the one or more flashes emitted by each ESL device in the group over the flash interval; and determining a location within the environment of each ESL device in the group based on the one or more flashes emitted by each ESL device in the visual data;

wherein each ESL device in the group is in a vicinity of the mobile device during a survey of the environment, and wherein the operations further comprise:

receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

20. The non-transitory, computer-readable medium of claim 19, the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise:

receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

21. The non-transitory, computer-readable medium of claim 19, wherein the one or more flashes include a first flash emitted simultaneously by all the ESL devices in the group at a reference point of the flash interval and second flashes emitted individually by individual ESL devices in the group at specified differences from the reference point of the flash interval, and wherein the operations further comprise:

detecting, within the visual data, the first flash emitted by all the ESL devices in the group and the second flash emitted by each ESL device in the group after the first flash;

determining a common reference time corresponding to the reference point of the flash interval for the group based on the first flash detected within the visual data; and identifying each ESL device in the group based on a specified difference corresponding to each ESL device and a timing of a second flash corresponding to each ESL device detected within the visual data relative to the common reference time.

22. The non-transitory, computer-readable medium of claim 19, wherein the operations for identifying further comprise:

receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

23. An electronic shelf label (ESL) system comprising:

a group of ESL devices deployed within an environment; and a server comprising a memory and at least one processor coupled to the memory, wherein the at least one processor is configured to perform operations comprising:

transmitting, to each ESL device in the group via a wireless network associated with the environment, a command to emit one or more flashes of light over a flash interval associated with the group;

receiving, from a mobile device via the wireless network, visual data collected for the group by a camera during the flash interval;

detecting, within the visual data, the one or more flashes emitted by each ESL device in the group over the flash interval; and determining a location within the environment of each ESL device in the group based on the one or more flashes emitted by each ESL device in the visual data;

wherein each ESL device in the group is in a vicinity of the mobile device during a survey of the environment, and wherein the operations further comprise:

receiving, from the mobile device via the wireless network during the survey, radio frequency (RF) measurements of wireless signals received by the mobile device from a subset of the ESL devices deployed within the environment; and identifying each ESL device in the group, based on the RF measurements received for the subset.

24. The ESL system of claim 23, wherein the one or more flashes detected in the visual data include a flash emitted by each ESL device in the group during a time period allocated to that ESL device over the flash interval, wherein the command also instructs each ESL device in the group to transmit an ESL beacon including identification information for that ESL device during the time period, and wherein the operations further comprise:

receiving, from the mobile device via the wireless network, the ESL beacon transmitted by each ESL device in the group over the flash interval; and identifying a different ESL device in the group for each flash detected in the visual data based on the identification information included in the ESL beacon transmitted during the time period corresponding to that flash.

25. The ESL system of claim 23, wherein the one or more flashes include a first flash emitted simultaneously by all the ESL devices in the group at a reference point of the flash interval and second flashes emitted individually by individual ESL devices in the group at specified differences from the reference point of the flash interval, and wherein the operations further comprise:

detecting, within the visual data, the first flash emitted by all the ESL devices in the group and the second flashes emitted by each ESL device in the group after the first flash;

determining a common reference time corresponding to the reference point of the flash interval for the group based on the first flash detected within the visual data; and identifying each ESL device in the group based on a specified difference corresponding to each ESL device and a timing of a second flash corresponding to each ESL device detected within the visual data relative to the common reference time.

26. The ESL system of claim 23, wherein the operations for identifying further comprise:

receiving, from at least one ESL device in the group, additional RF measurements of beacons transmitted by one or more neighboring ESL devices; and identifying the group of ESL devices in the vicinity of the mobile device, based on the RF measurements received from the mobile device and the additional RF measurements received from the at least one ESL device.

\* \* \* \* \*